US010965783B2

(12) United States Patent
Ding et al.

(10) Patent No.: US 10,965,783 B2
(45) Date of Patent: Mar. 30, 2021

(54) MULTIMEDIA INFORMATION SHARING METHOD, RELATED APPARATUS, AND SYSTEM

(71) Applicant: Tencent Technology (Shenzhen) Company Limited, Shenzhen (CN)

(72) Inventors: Zhixuan Ding, Shenzhen (CN); Pinxian Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/860,905

(22) Filed: Apr. 28, 2020

(65) Prior Publication Data

US 2020/0259931 A1 Aug. 13, 2020

Related U.S. Application Data

(63) Continuation of application No. PCT/CN2017/119786, filed on Dec. 29, 2017.

(51) Int. Cl.
*G06F 3/048* (2013.01)
*H04L 29/06* (2006.01)
(Continued)

(52) U.S. Cl.
CPC ............ *H04L 67/38* (2013.01); *G06F 3/1454* (2013.01); *G06T 19/006* (2013.01);
(Continued)

(58) Field of Classification Search
None
See application file for complete search history.

(56) References Cited

U.S. PATENT DOCUMENTS

2008/0177822 A1\* 7/2008 Yoneda ............ H04N 21/64322
709/202
2009/0222116 A1\* 9/2009 Kang .................. H04M 1/6066
700/94
(Continued)

FOREIGN PATENT DOCUMENTS

CN 102650906 A 8/2012
CN 103257813 A 8/2013
(Continued)

OTHER PUBLICATIONS

Tencent Technology, WO, PCT/CN2017/119786, Sep. 19, 2018, 4 pgs.

(Continued)

*Primary Examiner* — Jeanette J Parker
(74) *Attorney, Agent, or Firm* — Morgan, Lewis & Bockius LLP

(57) ABSTRACT

The present disclosure discloses a multimedia information sharing method performed by a first multimedia information sharing apparatus, including: receiving, via a VR display desktop, a multimedia information sharing instruction; determining to-be-transmitted target multimedia information according to the multimedia information sharing instruction; transmitting the target multimedia information to a VR server, and the VR server transmits the target multimedia information to a second multimedia information sharing apparatus that uses the multimedia information to generate VR target multimedia information corresponding to the target multimedia information and present the VR target multimedia information. In the present disclosure, multimedia information is processed into VR target multimedia information, so that both an information receiving party and an information transmitting party can view the VR target (Continued)

multimedia information in a VR environment, thereby improving interactivity during information sharing.

18 Claims, 13 Drawing Sheets

(51) Int. Cl.
*G06F 3/14* (2006.01)
*G06T 19/00* (2011.01)
*H04L 29/08* (2006.01)

(52) U.S. Cl.
CPC .... *H04L 29/06027* (2013.01); *H04L 65/4084* (2013.01); *H04L 67/06* (2013.01)

(56) References Cited

U.S. PATENT DOCUMENTS

| | | | |
|---|---|---|---|
| 2012/0081393 A1* | 4/2012 | Kim | G06F 3/011 345/633 |
| 2014/0080592 A1 | 3/2014 | Shuster | |
| 2016/0210016 A1* | 7/2016 | Shin | G06F 3/0482 |
| 2017/0237789 A1* | 8/2017 | Harner | G06F 3/017 709/205 |
| 2017/0244655 A1* | 8/2017 | Moon | H04L 12/185 |
| 2018/0074679 A1* | 3/2018 | Wang | G06F 3/04812 |

FOREIGN PATENT DOCUMENTS

| | | |
|---|---|---|
| CN | 103488356 A | 1/2014 |
| CN | 105892686 A | 8/2016 |
| CN | 105898694 A | 8/2016 |
| CN | 106358090 A | 1/2017 |
| CN | 106790553 A | 5/2017 |
| CN | 106791699 A | 5/2017 |
| CN | 106941538 A | 7/2017 |
| CN | 107085611 A | 8/2017 |
| CN | 107168530 A | 9/2017 |

OTHER PUBLICATIONS

Tencent Technology, IPRP, PCT/CN2017/119786, Jun. 30, 2020, 5 pgs.
Tencent Technology, ISR, PCT/CN2017/119786, dated Sep. 19, 2019, 3 pgs.

* cited by examiner

Select an image file   Present a VR image

Three-dimensional model file   Present a VR three-dimensional model

Audio file      Play a 3D audio file

MULTIMEDIA INFORMATION SHARING METHOD, RELATED APPARATUS, AND SYSTEM

CROSS-REFERENCE TO RELATED APPLICATIONS

This application is a continuation application of PCT Application No. PCT/CN2017/119786, entitled "METHOD FOR SHARING MULTIMEDIA INFORMATION, RELATED APPARATUS, AND SYSTEM" filed on Dec. 29, 2017, which is incorporated by reference in its entirety.

FIELD OF THE TECHNOLOGY

The present disclosure relates to the field of communications, and in particular, to a multimedia information sharing method, a related apparatus, and a system.

BACKGROUND OF THE DISCLOSURE

With rapid development of computer technologies, cases in which users perform remote communication become more common. To improve communication efficiency and enrich communication diversity, multimedia information can be shared in remote communication, and the multimedia information may include content such as an image, audio, a video, and a file.

Currently, users may receive/transmit multimedia information from/to each other by using an instant messaging application program. For example, a user A transmits an image and the like to a user B by using "WeChat", or the user A transmits audio and the like to a plurality of users in one group by using "WeChat", and then other users may receive multimedia information sent by the user by using "WeChat".

However, for an information receiving party, multimedia information that is received by using an instant messaging application program is relatively monotonous, and the multimedia information cannot be used for performing interaction with an information transmitting party. Only a function of browsing the multimedia information is implemented, and it would be difficult to satisfy flexibility and diversity of information exchange.

SUMMARY

Embodiments of the present disclosure provide a multimedia information sharing method, a related apparatus, and a system, to process multimedia information into virtual reality (VR) target multimedia information, so that both an information receiving party and an information transmitting party can view the VR target multimedia information in a VR environment. The VR target multimedia information has relatively good flexibility and diversity, thereby improving interactivity during information sharing.

A first aspect of the embodiments of the present disclosure provides a multimedia information sharing method, applied to a multimedia information sharing system, the multimedia information sharing system including a first multimedia information sharing apparatus, a VR server, and a second multimedia information sharing apparatus. The method includes:

receiving, via a VR display desktop at the first multimedia information sharing apparatus, a multimedia information sharing instruction, the VR display desktop being configured to present a multimedia information icon, the multimedia information sharing instruction being used for selecting the multimedia information icon, and the multimedia information icon having a correspondence with multimedia information;

determining, at the first multimedia information sharing apparatus, to-be-transmitted target multimedia information according to the multimedia information sharing instruction;

transmitting the target multimedia information from the first multimedia information sharing apparatus to the VR server, wherein the VR server transmits the target multimedia information to the second multimedia information sharing apparatus, the multimedia information being used by the second multimedia information sharing apparatus to generate VR target multimedia information corresponding to the target multimedia information and present the VR target multimedia information; and generating, at the second multimedia information sharing apparatus, the VR target multimedia information according to the target multimedia information, and presenting the VR target multimedia information.

A second aspect of the embodiments of the present disclosure provides a multimedia information sharing system comprising a virtual reality (VR) server, a first multimedia information sharing apparatus, and a second multimedia information sharing apparatus, each having memory, a processor, and a bus system, the memory being configured to store a plurality of programs; the processor being configured to execute the plurality of programs in the memory to perform the aforementioned multimedia information sharing method.

A third aspect of the present disclosure provides a non-transitory computer-readable storage medium comprising a plurality of program instructions, the program instructions, when executed by a multimedia information sharing system comprising a virtual reality (VR) server, a first multimedia information sharing apparatus, and a second multimedia information sharing apparatus, cause the multimedia information sharing system to perform the aforementioned multimedia information sharing method.

In the technical solutions provided in the embodiments of the present disclosure, a multimedia information sharing method is provided. The method is applied to a multimedia information sharing system, the multimedia information sharing system including a first multimedia information sharing apparatus, a VR server, and a second multimedia information sharing apparatus. The first multimedia information sharing apparatus receives a multimedia information sharing instruction, then determines to-be-transmitted multimedia information according to the multimedia information sharing instruction, and transmits the multimedia information to the VR server, to enable the VR server to transmit the multimedia information to the second multimedia information sharing apparatus, the multimedia information being used by the second multimedia information sharing apparatus to generate VR target multimedia information and present the VR target multimedia information. The VR target multimedia information is generated according to the multimedia information, and the VR target multimedia information is presented. The multimedia information is processed into the VR target multimedia information in the foregoing manner, so that both an information receiving party and an information transmitting party can view the VR target multimedia information in a VR environment. The VR target multimedia information has relatively good flexibility and diversity, thereby improving interactivity during information sharing.

DESCRIPTION OF EMBODIMENTS

The following clearly and completely describes the technical solutions in embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and the like (if existing) are intended to distinguish between similar objects rather than describe a specific order or sequence. It is to be understood that the data termed in such a way are interchangeable in proper circumstances so that the embodiments described herein can be implemented in other orders than the order illustrated or described herein. Moreover, the terms "include", "have" and any other variants thereof mean to cover the non-exclusive inclusion. For example, a process, method, system, product, or device that includes a list of steps or units is not necessarily limited to those clearly listed steps or units, but may include other steps or units that are not clearly listed or inherent to such a process, method, system, product, or device.

Figure 1:
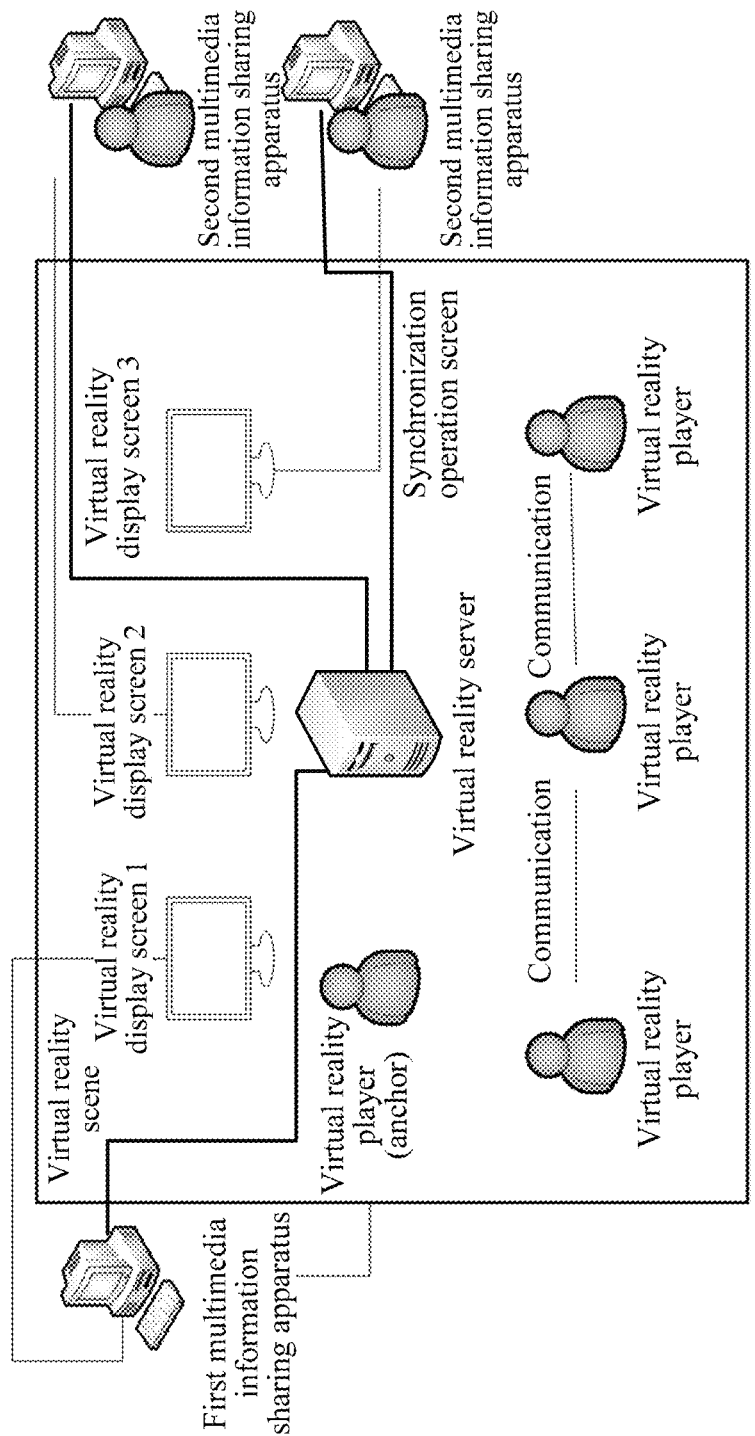
FIG. 1 is an architectural diagram of a multimedia information sharing system according to an embodiment of the present disclosure.

It is to be understood that the present disclosure is applied to a multimedia information sharing system. FIG. 1 is an architectural diagram of the multimedia information sharing system according to an embodiment of the present disclosure. As shown in FIG. 1, three VR live screen and four VR players included in the figure are merely used as an example. In an actual application, there may be more or fewer VR players and there may be more or fewer VR display screens. Therefore, the quantity of VR players and the quantity of VR display screens are not limited herein.

Referring to FIG. 1, an entire process of generating and sharing a VR multimedia file includes: a VR player as an anchor first presents a synchronization operation screen by using a VR display desktop on a personal computer (PC). The PC needs to be further externally connected to a VR output device before presenting the VR display desktop, to be capable of outputting a VR signal. For example, one or more multimedia files are selected on the VR display desktop, the one or more multimedia files are uploaded to a server by using the PC, and then the server forwards the multimedia files to another PC. Meanwhile, the multimedia files selected by the anchor VR player are presented on a VR display screen 1 by using a VR technology, that is, rendering a desktop onto the VR display screen in a form of a tile.

Another VR player receives a desktop screen on the PC of the anchor from the server in real time, restores the original multimedia files through decompression, and renders the screen onto a VR display screen of a scenario also in a form of a tile. For example, a viewer A may request, on a local PC, the server to provide the screen on the desktop of the PC of the anchor, and then the server can transmit the screen on the desktop of the PC of the anchor to a VR display screen 2 according to the request of the viewer A, so that the viewer A views the VR screen on the VR display screen 2.

It may be understood that a VR display screen may be a VR display desktop, that is, mapping a VR display desktop onto a VR display screen through an externally connected VR output device, so that they are integrated.

The VR technology is a computer simulation system through which a virtual world can be created and experienced. In the VR technology, a computer is used to generate a simulated environment, that is, a multi-source information fusion-based system with a 3D dynamic scene and an entity behavior that are interactive, to enable a user to be immersed into the environment.

Figure 2:
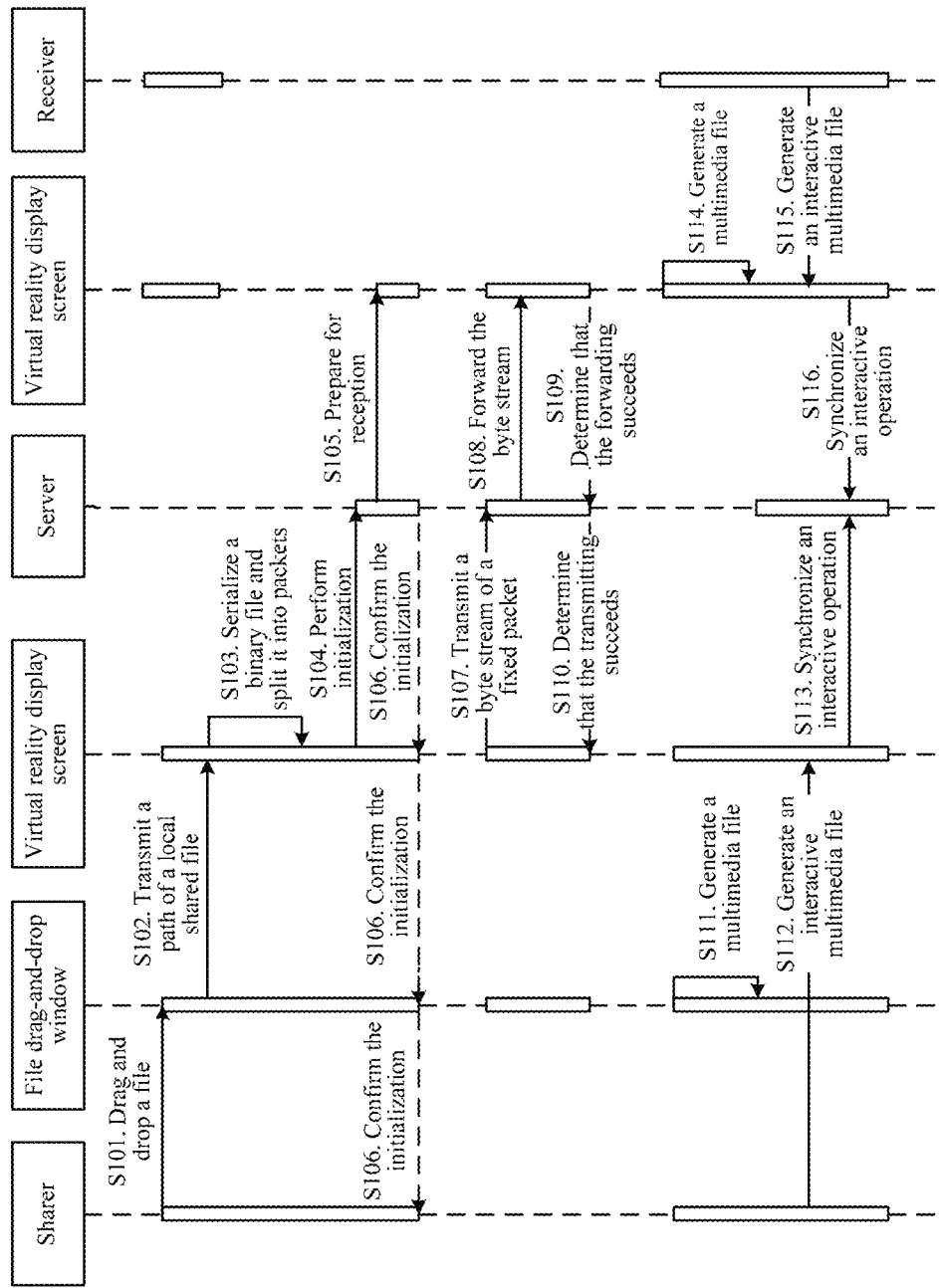
FIG. 2 is a schematic diagram of an interaction embodiment of a multimedia information sharing method according to an embodiment of the present disclosure.

For ease of understanding, FIG. 2 is a schematic diagram of an interaction embodiment of a multimedia information sharing method according to an embodiment of the present disclosure. With reference to content of FIG. 1 and FIG. 2, the method specifically includes:

In step S101, a VR player as an anchor drags and drops a multimedia file to a file transfer window on a VR display desktop on a PC end by using the VR display desktop.

In step S102, the PC transmits a path of a local shared file to a VR display screen. That is, the file transfer window obtains a file path of the multimedia file dragged and dropped into the window, and then transmits the file path to the VR display screen in a scenario.

In step S103, the VR display screen may read a local multimedia file of a user into internal memory in a binary form, and split the multimedia file into different packets.

In step S104, the VR display screen transmits, to a server, a request of transmitting the local file, causing the server to perform initialization.

In step S105, receivers prepare to receive the multimedia file. That is, the server transmits a message, to all other receivers in the VR scenario, indicating that a sharer transmits the multimedia file.

In step S106, the server confirms that the initialization succeeds and transmits feedback to the sharer.

In step S107 to step S110, a byte stream of a fixed packet is transmitted, and after it is confirmed that a message is transmitted, the local VR display screen of the sharer initiates a transmitting thread, to transmit a file byte stream of one packet each frame according to bandwidth capabilities of the server and a client, and after confirming that forwarding succeeds, the server further feeds back the message to the transmitter. After it is confirmed that the transmitting succeeds, the transmitter continues to transmit data of a next byte packet. The entire process continues until the shared file is completely transmitted.

In step S111, in the VR scenario, the VR display screen of the sharer generates an interactive multimedia file.

In step S112, after it is confirmed that the transmitting succeeds, the VR display screen of the sharer generates a corresponding interactive file according to a type of a received file.

In step S113, the sharer performs an operation on the multimedia file, and uploads information of the operation into the server.

In step S114, in the VR scenario, VR display screens of the receivers generate interactive multimedia files.

In step S115, after it is confirmed that the transmitting succeeds, all the VR display screens of the receivers generate corresponding interactive files according to a type of the received file.

In step S116, the receivers perform an operation on the multimedia file, and upload information of the operation into the server.

Figure 3:
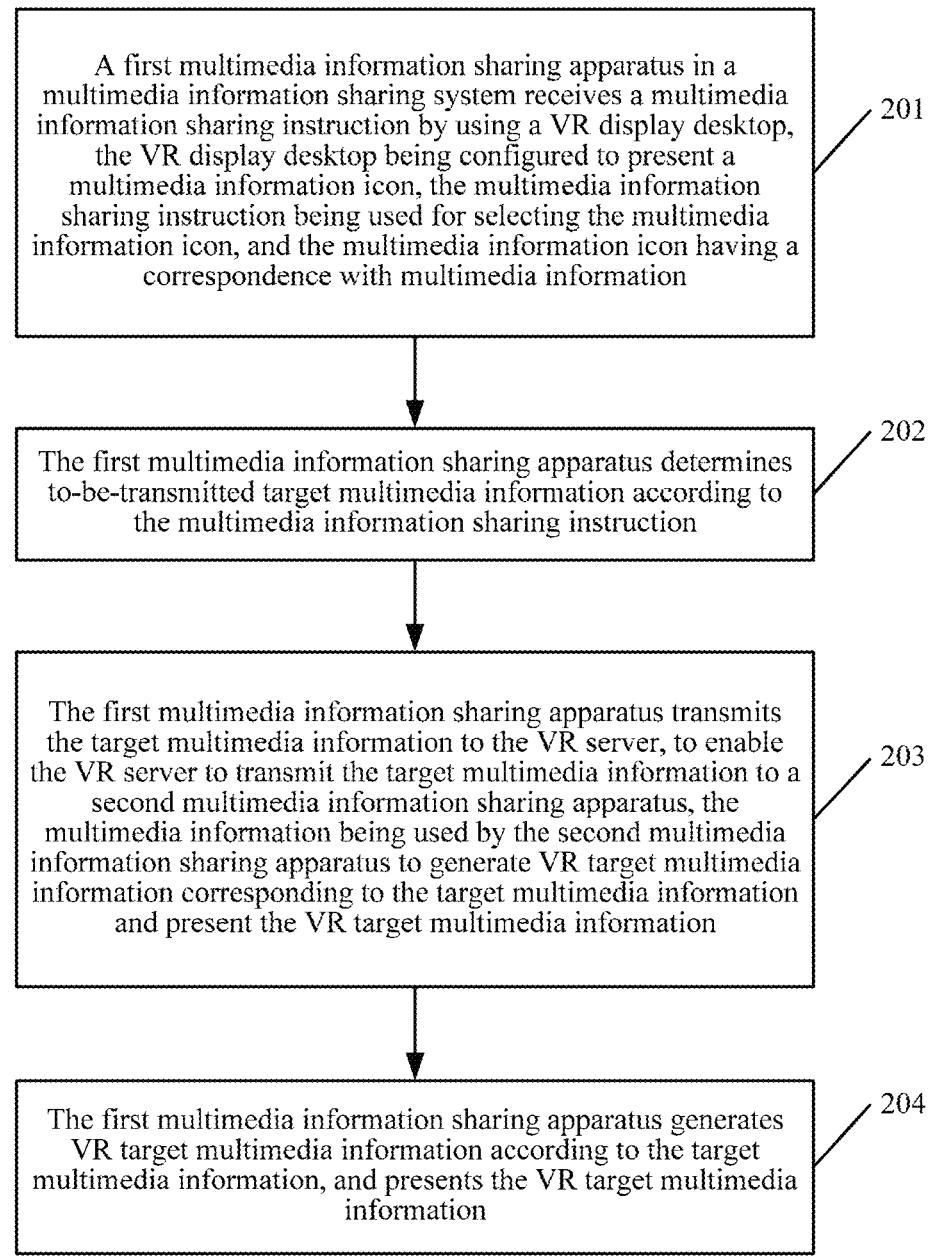
FIG. 3 is a schematic diagram of an embodiment of a multimedia information sharing method according to an embodiment of the present disclosure.

The multimedia information sharing method in the present disclosure is described below from the perspective of a first multimedia information sharing apparatus. Referring to FIG. 3, an embodiment of the multimedia information sharing method in an embodiment of the present disclosure includes the following steps.

201. Receive a multimedia information sharing instruction by using a VR display desktop, the VR display desktop being configured to present a multimedia information icon, the multimedia information sharing instruction being used for selecting the multimedia information icon, and the multimedia information icon having a correspondence with multimedia information. A multimedia information sharing system further includes a VR server and a second multimedia information sharing apparatus.

In this embodiment, the multimedia information sharing system includes a first multimedia information sharing apparatus, at least one second multimedia information sharing apparatus, and the VR server. The first multimedia information sharing apparatus may further include three parts, and the three parts specifically are: a controller, a VR display screen, and a terminal device. The terminal device may be a PC, a notebook computer, a tablet computer, or the like, and is not limited herein.

First, the first multimedia information sharing apparatus receives the multimedia information sharing instruction triggered by a user. The multimedia information sharing instruction may be a click instruction or a drag instruction. The user herein specifically refers to a sharer of multimedia information or an anchor.

The terminal device included in the first multimedia information sharing apparatus has a VR display desktop. The user may perform an operation on a multimedia information icon on an interface by using the VR display desktop. Each multimedia information icon corresponds to one piece of multimedia information. For example, an icon A corresponds to an image A, and an icon B corresponds to a video B.

202. The first multimedia information sharing apparatus determines to-be-transmitted target multimedia information according to the multimedia information sharing instruction.

In this embodiment, the first multimedia information sharing apparatus determines the corresponding to-be-transmitted target multimedia information according to the multimedia information sharing instruction. For example, the user clicks an image, that is, triggers a multimedia information sharing instruction, and subsequently, determines the image as the to-be-transmitted target multimedia information.

203. Transmit the target multimedia information to the VR server, to enable the VR server to transmit the target multimedia information to the second multimedia information sharing apparatus, the multimedia information being used by the second multimedia information sharing apparatus to generate the VR target multimedia information corresponding to the target multimedia information and present the VR target multimedia information.

In this embodiment, subsequently, the first multimedia information sharing apparatus transmits the target multimedia information to the VR server. After receiving the target multimedia information, the VR server may transmit the target multimedia information to the second multimedia information sharing apparatus. The second multimedia information sharing apparatus may generate corresponding VR target multimedia information according to the target multimedia information, and further present the VR target multimedia information.

204. The first multimedia information sharing apparatus generates VR target multimedia information according to the target multimedia information, and presents the VR target multimedia information.

In this embodiment, the first multimedia information sharing apparatus may alternatively generate VR target multimedia information according to multimedia information, and presents the VR target multimedia information.

In the technical solution provided in this embodiment of the present disclosure, a multimedia information sharing method is provided. Multimedia information is processed into VR target multimedia information, so that both an information receiving party and an information transmitting party can view the VR target multimedia information in a VR environment. The VR target multimedia information has relatively good flexibility and diversity, thereby improving interactivity during information sharing.

Optionally, based on the embodiment corresponding to the foregoing FIG. 3, in a first optional embodiment of the multimedia information sharing method provided in the embodiments of the present disclosure, the receiving a multimedia information sharing instruction by using a VR display desktop may include:

obtaining a screen ratio value and real-time operation information by using the VR display desktop, the screen ratio value being used for representing a ratio of a space coordinate value to a reference coordinate value, and the real-time operation information being used for representing an operation performed by a user on a controller; and generating the multimedia information sharing instruction according to the screen ratio value and the real-time operation information.

In this embodiment, after receiving the multimedia information sharing instruction, the first multimedia information sharing apparatus may alternatively generate a screen ratio value and real-time operation information according to the multimedia information sharing instruction, to determine the to-be-transmitted multimedia information with reference to the screen ratio value and the real-time operation information.

Figure 4:
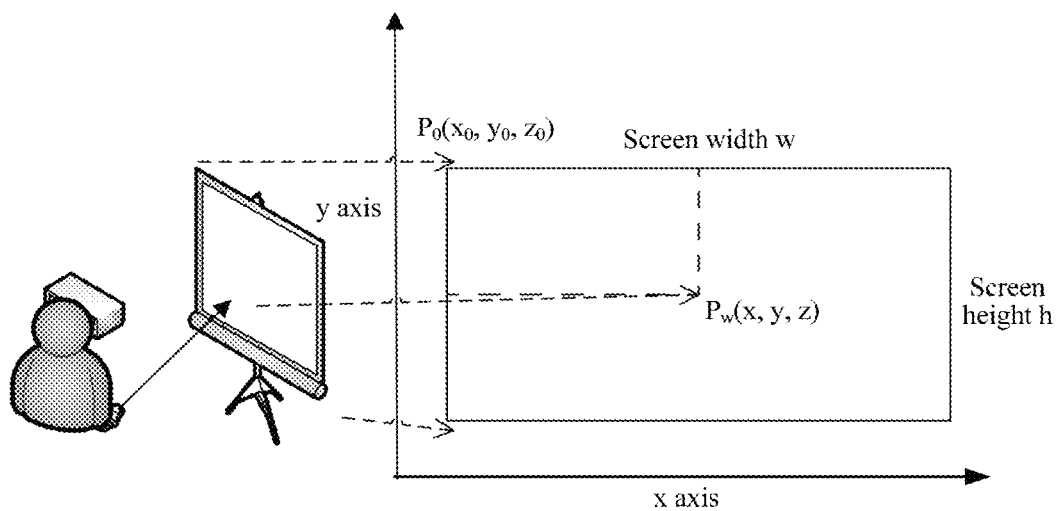
FIG. 4 is a schematic diagram of an embodiment of mapping user input according to an embodiment of the present disclosure.

FIG. 4 is a schematic diagram of an embodiment of mapping user input according to an embodiment of the present disclosure. As shown in the figure, interaction between a user and a VR display screen is a mouse operation of mapping, to a local terminal of the user, an intersection between a controller in a hand of the user and a rectangular projection area of the VR display screen in a VR scenario. Specific steps are as follows: First, a space coordinate value between a ray of the controller and the VR display screen is obtained according to a multimedia information sharing instruction, both the controller and the VR display screen belonging to a first multimedia information sharing apparatus. The space coordinate value between the ray of the controller and the VR display screen is $P_w(x, y, z)$, and then a screen ratio value is determined according to the space coordinate value and a reference coordinate value of the VR display screen.

Assuming that the reference coordinate value of the VR display screen may be a point on an upper left corner of the screen, that is, $P_0(x_0, y_0, z_0)$, a ratio at which the coordinate point $P_w(x, y, z)$ is mapped to the screen according to the upper left point $P_0(x_0, y_0, z_0)$ on the screen is determined as the screen ratio value, and the screen ratio value is $P_s(u, v)$:

$$u=(x-x0)/w$$

$$v=(y-y0)/h$$

where w represents a width value of the VR display screen, and h represents a height value of the VR display screen.

A real-time mouse position $P_m(u_m, v_m)$ of the user can be calculated according to the calculated $P_s$, where $u_m=u\times width$ of a terminal screen, and $v_m=v\times height$ of the terminal screen. $P_s$ is the screen ratio value.

The first multimedia information sharing apparatus may map a left key and a right key of the mouse according to keys on a peripheral hand controller, and captures the mapping to obtain states of the keys of the mouse such as being clicked, being double-clicked, and being pressed and held, to form real-time operation information. Provided that mouse position and a key pressing manner are obtained, the screen ratio value and the real-time operation information are obtained. Finally, a click operation of the user corresponding to the mouse position Pm of the user is mapped to a mouse event by using an application programming interface (API), to determine to-be-transmitted multimedia information corresponding to the mouse event.

Besides, in this embodiment of the present disclosure, how to determine to-be-transmitted multimedia information according to a multimedia information sharing instruction triggered by a user is described. That is, a first multimedia information sharing apparatus obtains a space coordinate value between a ray of a controller and a VR display screen according to the multimedia information sharing instruction, then determines a screen ratio value according to the space coordinate value and a reference coordinate value of the VR display screen, and finally obtains a real-time mouse position of the user according to the screen ratio value, a width value of the VR display screen, and a height value of the VR display screen. In addition, real-time operation information is further obtained according to the multimedia information sharing instruction, and the to-be-transmitted multimedia information is determined with reference to the screen ratio value and the real-time operation information. In the foregoing manner, feasibility and operability of the solution in an actual application are improved.

Optionally, based on the embodiment corresponding to the foregoing FIG. 3, in a second optional embodiment of the multimedia information sharing method provided in the embodiments of the present disclosure, after the generating VR target multimedia information according to multimedia information, and presenting the VR target multimedia information, the method may further include:

receiving an interactive operation instruction;

performing an operation on the VR target multimedia information according to the interactive operation instruction, to generate interactive operation information, the operation comprising at least one of selection, move, zoom-in, zoom-out, and playback; and transmitting the interactive operation information to the server, to enable the server to transmit the interactive operation information to the second multimedia information sharing apparatus, the interactive operation information being used for instructing the second multimedia information sharing apparatus to perform the operation on the VR target multimedia information.

In this embodiment, after generating the VR target multimedia information according to the multimedia information and presenting the VR target multimedia information, the first multimedia information sharing apparatus may further receive an operation performed by a user (sharer) on the first multimedia information sharing apparatus. The operation includes at least one of selection, move, zoom-in, zoom-out, and playback. An interactive operation instruction triggered by the user is first received. For example, the interactive operation instruction is an action of moving a VR image. The first multimedia information sharing apparatus then performs a corresponding operation on a local VR display screen according to the action, that is, moving the VR image from left to right. Meanwhile, the first multimedia information sharing apparatus generates a piece of interactive operation information according to the interactive operation instruction, the interactive operation information carrying content of the operation of the user, for example, "moving a VR image from left to right". In this way, the first multimedia information sharing apparatus transmits the interactive operation information to the server, to enable the server to transmit the interactive operation information to the second multimedia information sharing apparatus.

The second multimedia information sharing apparatus may perform an operation on the VR target multimedia information according to the interactive operation information, that is, moving the VR image from left to right on a VR display screen of a receiver, to synchronously present the VR target multimedia information.

Besides, in this embodiment of the present disclosure, after presenting the VR target multimedia information, the first multimedia information sharing apparatus may further receive an interactive operation instruction, then perform an operation on the VR target multimedia information according to the interactive operation instruction, to generate interactive operation information, and finally transmit the interactive operation information to the server. The server transmits the interactive operation information to the second multimedia information sharing apparatus. In the foregoing manner, a sharer may perform a corresponding operation on VR target multimedia information according to a requirement. By performing such an operation, interactive operation information is formed, and a receiver performs the same operation on the VR target multimedia information according to the interactive operation information, to improve flexibility and practicality of VR target multimedia information presentation, and strengthen interactivity between a user and the VR target multimedia information.

Figure 5:
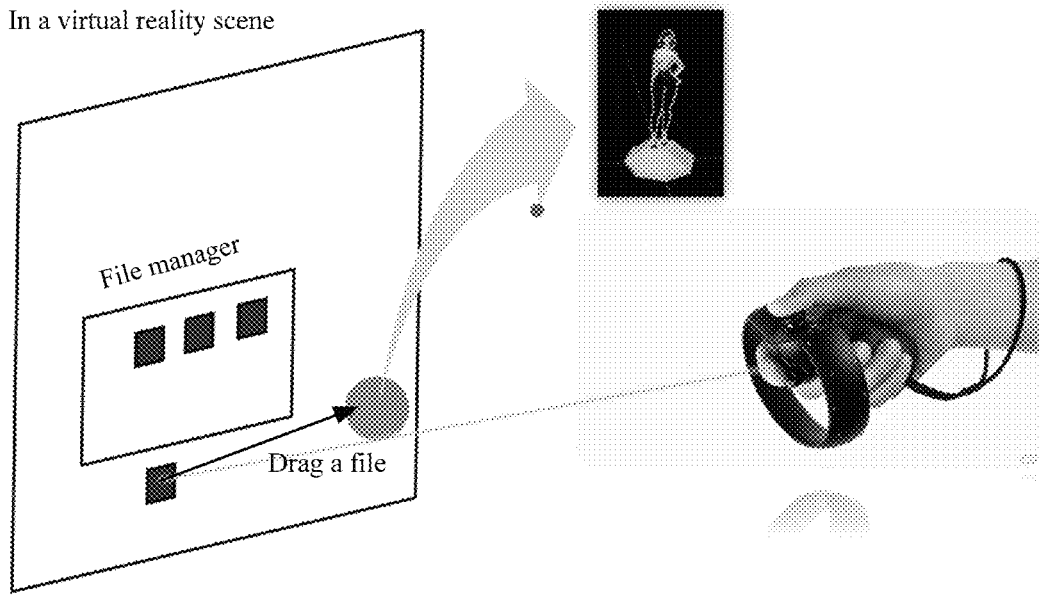
FIG. 5 is a schematic diagram of a user dragging and generating a file in a VR scenario according to an embodiment of the present disclosure.

For ease of understanding, how to generate VR target multimedia information in a VR scenario is described below. FIG. 5 is a schematic diagram of a user dragging and generating a file in a VR scenario according to an embodiment of the present disclosure. As shown in the figure, after a user performs a local operation by using a VR display screen, a pop-up window may be created on a lower right part of a terminal desktop. The window can receive a file dragging operation performed by the user in a local browser, and can read a path of a file dragged into the window. Once the user drags and drops a desktop file into the window, whether the desktop file conforms to a predefined file format (such as an image, text, a 3D model, and an audio file) may be identified, and the file is packed and sent to a VR server. The VR server forwards the file to a second multimedia information sharing apparatus in the VR scenario.

After receiving the file, the second multimedia information sharing apparatus generates an operable item according to a type of the file for the user to perform interaction. Specific steps are as follows:

After the VR display screen presents an operating desktop, the user may open a resource manager of the desktop in the VR scenario, and drags or moves a file as performing a normal mouse operation. Meanwhile, a "portal window" is generated on the desktop, for the user to drag and drop multimedia files (such as an image file, a text file, a 3D model file, and an audio file) in some resource managers into the window. Subsequently, the window further generates a preview of the file in the VR scenario and forms an interactive item.

Optionally, based on the foregoing FIG. 3 and the first or second embodiment corresponding to FIG. 3, in a third optional embodiment of the multimedia information sharing method provided in the embodiments of the present disclosure, multimedia information is an image file.

The generating VR target multimedia information according to the target multimedia information, and presenting the VR target multimedia information may include:

creating a corresponding first tile according to the image file, the first tile being used for binding image data in the image file;

mapping the first tile to a pre-configured rectangular mesh model, to obtain a VR image; and presenting the VR image by using a VR display screen.

In this embodiment, how to generate a corresponding VR image in a case in which the multimedia information is an image file is described.

Figure 6:
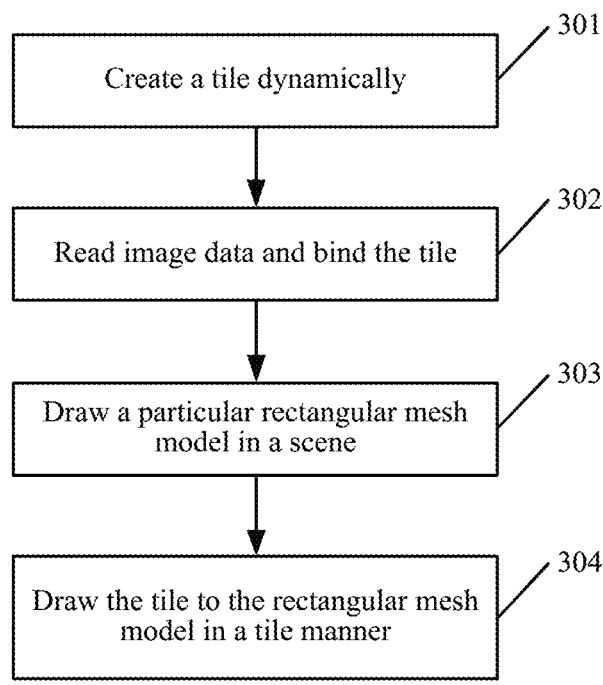
FIG. 6 is a schematic flowchart of generating a VR image according to an embodiment of the present disclosure.
Figure 7:
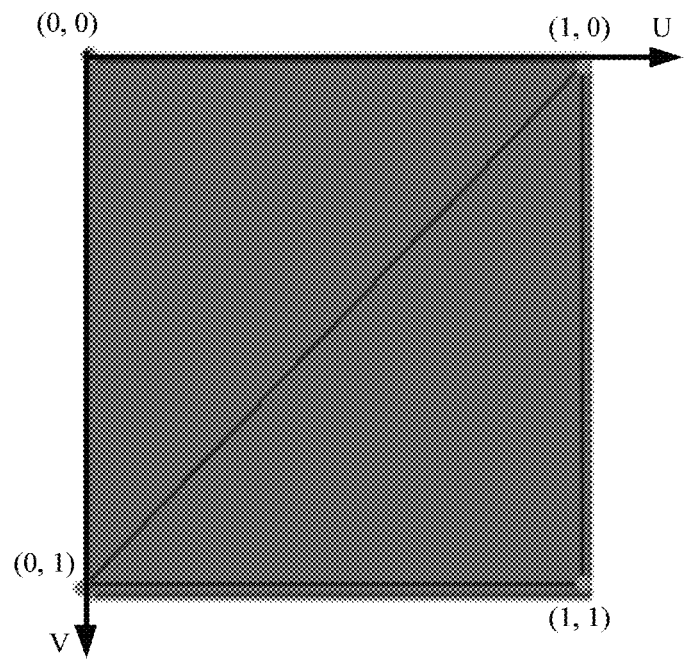
FIG. 7 is a schematic diagram of a pre-configured rectangular mesh model according to an embodiment of the present disclosure.
Figure 8:
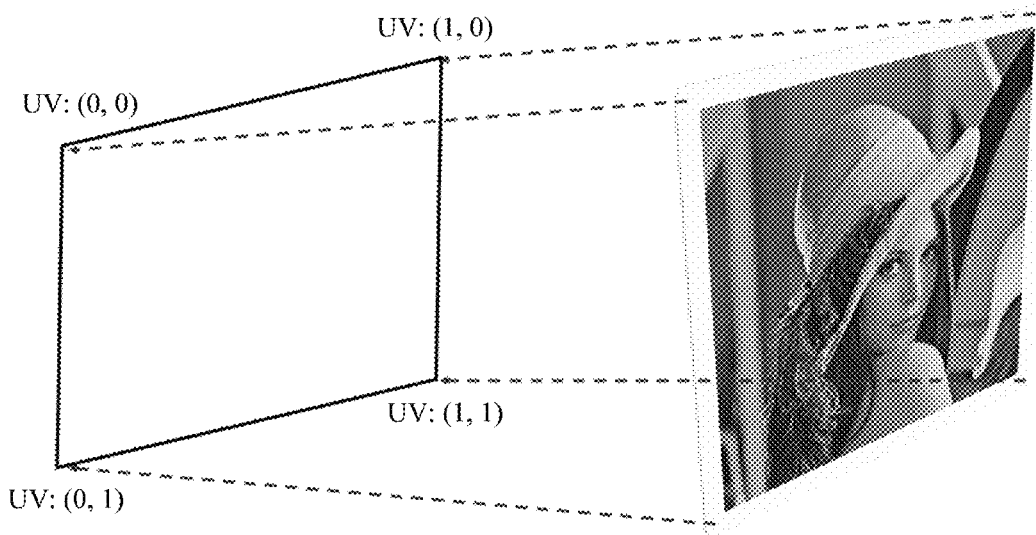
FIG. 8 is a schematic diagram of mapping a first tile to a pre-configured rectangular mesh model according to an embodiment of the present disclosure.

Specifically, FIG. 6 is a schematic flowchart of generating a VR image according to this embodiment of the present disclosure. As shown in the figure, in step 301, a first multimedia information sharing apparatus dynamically creates internal memory corresponding to a tile according to a size, a format, and a type of an image in a graphics processing unit (GPU), that is, creating a first tile. In step 302, internal memory of the first tile may be read according to a format of the first tile, and tile data is bound into a GPU channel according to the corresponding format of the first tile. In step 303, a rectangular mesh model is generated at a particular position inside the VR scenario. FIG. 7 is a schematic diagram of a pre-configured rectangular mesh model according to this embodiment of the present disclosure. Vertexes UV of a rectangle are arranged in a manner shown in FIG. 7. In step 304, after the foregoing tile is obtained, a pixel in the tile may be sampled according to UV coordinates of a model vertex, and is drawn at the point. In this way, a tile model may be mapped onto the rectangular mesh model in the scenario in real time, as shown in FIG. 8. FIG. 8 is a schematic diagram of mapping the first tile to the pre-configured rectangular mesh model according to this embodiment of the present disclosure.

Moreover, in this embodiment of the present disclosure, in a case in which the multimedia information is an image file, a corresponding first tile may be created according to the image file, then the first tile is mapped to the pre-configured rectangular mesh model, to obtain a VR image, and finally the VR image is presented by using a VR display screen. In the foregoing manner, a common image may be presented to a user in a form of a VR image for viewing and operating, to improve practicality and feasibility of the solution. Relatively strong multi-perception, sense of existence, and autonomy exist in the VR scenario.

Optionally, based on the foregoing FIG. 3 and the first or second embodiment corresponding to the foregoing FIG. 3, in a fourth optional embodiment of the multimedia information sharing method provided in the embodiments of the present disclosure, multimedia information is a 3D model file.

The generating VR target multimedia information according to the target multimedia information, and presenting the VR target multimedia information may include:

creating a corresponding second tile according to the three-dimensional model file, the second tile being used for binding three-dimensional model data in the three-dimensional model file;

mapping the second tile to a pre-configured three-dimensional mesh model, to obtain a VR three-dimensional model; and presenting the VR three-dimensional model by using the VR display screen.

In this embodiment, how to generate corresponding VR target multimedia information in a case in which the multimedia information is a 3D model file is described. Drawing of the 3D model in the VR scenario is similar to drawing of a conventional 3D model in a game engine, and a difference lies in that a 3D model shared by a user is created in real time by a first multimedia information sharing apparatus during a running process.

Figure 9:
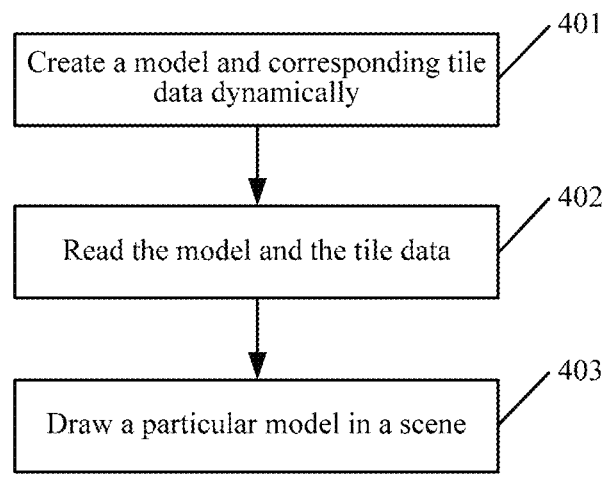
FIG. 9 is a schematic flowchart of generating a virtual three-dimensional (3D) model according to an embodiment of the present disclosure.
Figure 10:
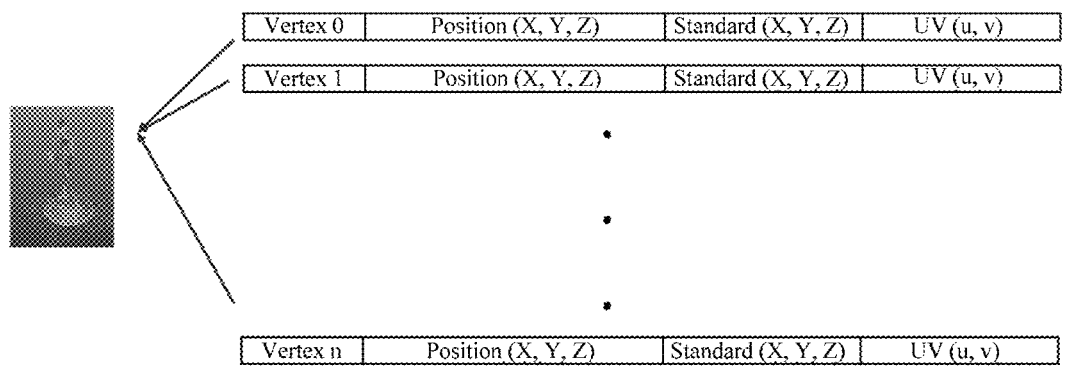
FIG. 10 is a schematic diagram of a vertex sequence of a pre-configured 3D mesh model according to an embodiment of the present disclosure.

Specifically, FIG. 9 is a schematic flowchart of generating a virtual 3D model according to this embodiment of the present disclosure. As shown in the figure, in step 401, the first multimedia information sharing apparatus first dynamically creates a 3D model file and a corresponding second tile. In step 402, in a rendering pipeline, vertex stream data of a pre-configured 3D mesh model, patch sequence data, and the second tile corresponding to the model are read into internal memory, and are bound to the created model and tile video memory. FIG. 10 is a schematic diagram of a vertex sequence of the pre-configured 3D mesh model according to this embodiment of the present disclosure. In step 403, a VR 3D model is drawn at a particular position, and is colored in the GPU according to a specified style.

Moreover, in this embodiment of the present disclosure, in a case in which the multimedia information is a 3D model file, the first multimedia information sharing apparatus may create a corresponding second tile according to the 3D model file, then map the second tile to the pre-configured 3D mesh model, to obtain a VR 3D model, and finally present the VR 3D model by using a VR display screen. In the foregoing manner, a common 3D model file may be presented to a user in a form of a VR 3D model for viewing and operating, to improve practicality and feasibility of the solution. Relatively strong multi-perception, sense of existence, and autonomy exist in the VR scenario.

Optionally, based on the foregoing FIG. 3 and the first or second embodiment corresponding to the foregoing FIG. 3, in a fifth optional embodiment of the multimedia information sharing method provided in the embodiments of the present disclosure, multimedia information is an audio file.

The generating VR target multimedia information according to the target multimedia information, and presenting the VR target multimedia information may include:

converting the audio file into a 3D audio file; and
playing the 3D audio file.

In this embodiment, in case in which a sharer shares an audio file, a to-be-played audio file is first locally determined, a first multimedia information sharing apparatus converts the audio file into a 3D audio file, and plays the 3D audio file by using a player.

Figure 11:
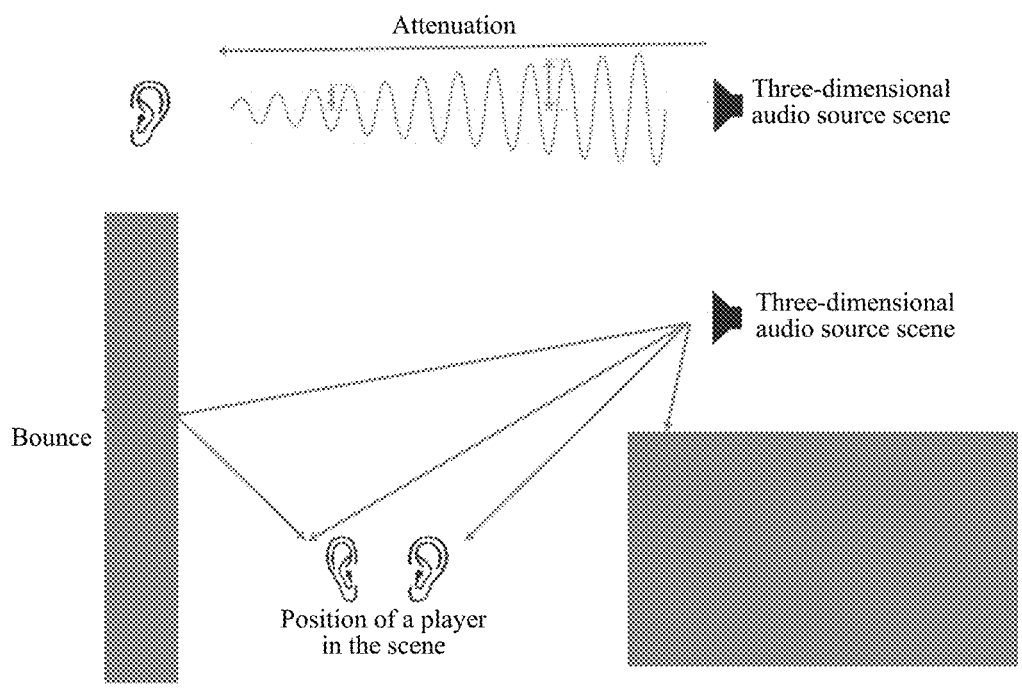
FIG. 11 is a schematic diagram of 3D audio according to an embodiment of the present disclosure.

Specifically, FIG. 11 is a schematic diagram of the 3D audio according to this embodiment of the present disclosure. Different from visible items such as an image and a 3D model, browsing of audio data is realized by audio playing. In a VR project, audio is also played in a form of 3D audio. The 3D audio is described below. The 3D audio requires calculating position relationships between positions of players (namely, a sharer and receivers) in a scene and a position of a source of a scene sound in real time. In addition to being attenuated according to a distance, the sound may be occluded, rebounded, and so on according to a geometrical relationship of the scene.

An effect of the 3D audio may be that sounds that seem to exist but are fictitious may be imitated by using loudspeakers. For example, loudspeakers imitate that an airplane flies overhead from left to right, and when a person closes eyes and listens, the person may feel that an airplane really flies overhead from left to right. This is the effect of the 3D audio.

Moreover, in this embodiment of the present disclosure, when multimedia information selected by a transmitting party is an audio file, the first multimedia information sharing apparatus may first convert the audio file selected by the transmitting party into a 3D audio file, and then play the 3D audio file. In the foregoing manner, both the transmitting party and a receiving party can hear 3D audio having a better stereo effect, so that practicality of the solution is improved, and user experience is enhanced.

Figure 12:
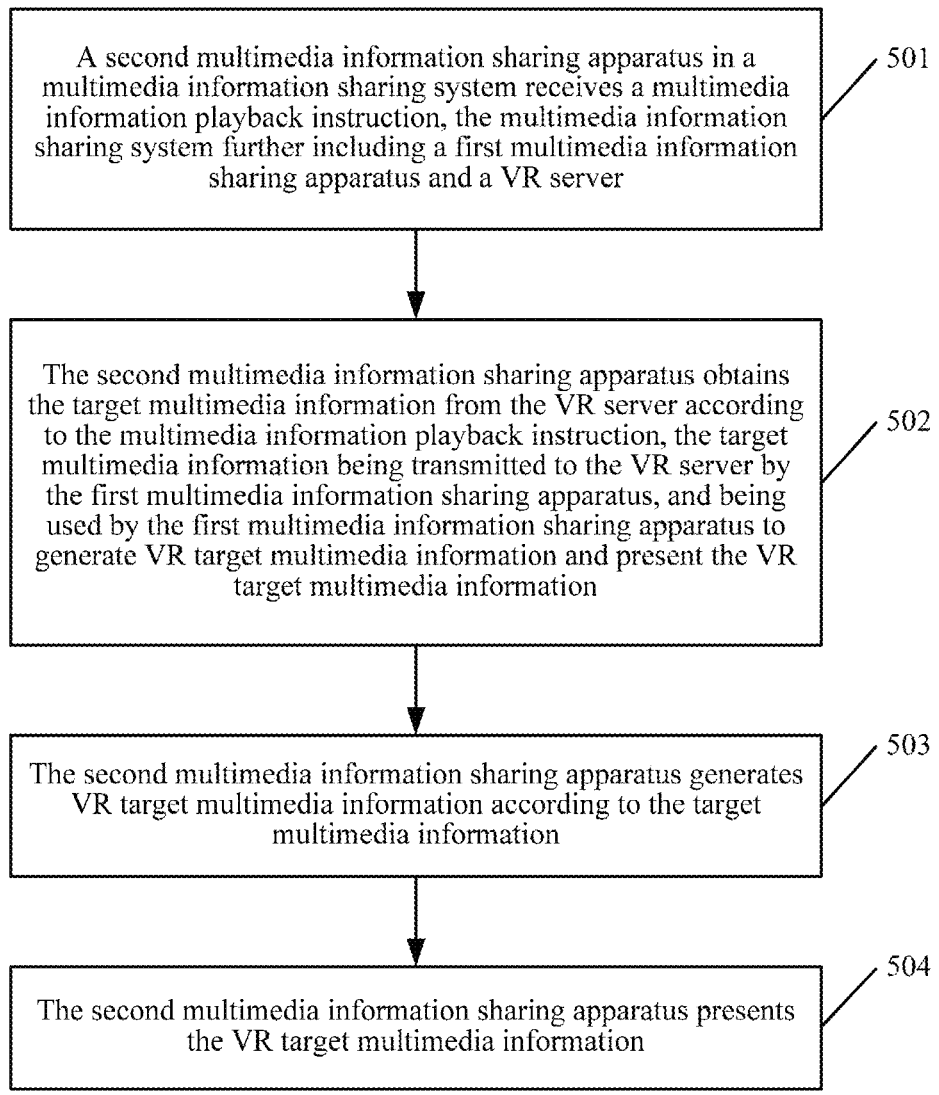
FIG. 12 is a schematic diagram of another embodiment of a multimedia information sharing method according to an embodiment of the present disclosure.

In the foregoing embodiments, the multimedia information sharing method in the present disclosure is described from the perspective of the first multimedia information sharing apparatus. The following describes the multimedia information sharing method in the present disclosure from the perspective of the second multimedia information sharing apparatus. Referring to FIG. 12, an embodiment of the multimedia information sharing method in the embodiments of the present disclosure includes the following steps.

501. A second multimedia information sharing apparatus in a multimedia information sharing system receives a multimedia information playback instruction, the multimedia information sharing system further including a first multimedia information sharing apparatus and a VR server.

In this embodiment, the multimedia information sharing system includes the first multimedia information sharing apparatus, the second multimedia information sharing apparatus, and the server. The second multimedia information sharing apparatus may further include three parts, and the three parts specifically are: a controller, a VR display screen, and a terminal device. The terminal device may be a PC, a notebook computer, a tablet computer, or the like, and is not limited herein.

First, the second multimedia information sharing apparatus receives a multimedia information sharing instruction triggered by a user. The multimedia information sharing instruction may be a click instruction. The user herein specifically refers to a receiver of target multimedia information.

502. The second multimedia information sharing apparatus obtains target multimedia information from the VR server according to the multimedia information playback instruction, the target multimedia information being transmitted to the VR server by the first multimedia information sharing apparatus, and being used by the first multimedia information sharing apparatus to generate VR target multimedia information and present the VR target multimedia information.

In this embodiment, the second multimedia information sharing apparatus receives the target multimedia information from the VR server according to the multimedia information playback instruction, the target multimedia information being transmitted to the VR server by the first multimedia information sharing apparatus. Meanwhile, the first multimedia information sharing apparatus also generates corresponding VR target multimedia information according to the target multimedia information, and presents the VR target multimedia information.

503. The second multimedia information sharing apparatus generates VR target multimedia information according to the target multimedia information.

In this embodiment, the second multimedia information sharing apparatus generates the VR target multimedia information based on local target multimedia information.

504. The second multimedia information sharing apparatus presents the VR target multimedia information.

In this embodiment, the second multimedia information sharing apparatus finally renders the VR target multimedia information and presents the VR target multimedia information, so that the receiver can view, by using the second multimedia information sharing apparatus, the VR target multimedia information shared by a sharer.

In this embodiment of the present disclosure, a multimedia information sharing method is provided. Multimedia information may be processed into VR target multimedia information, so that both an information receiving party and an information transmitting party can view the VR target multimedia information in a VR environment. The VR target multimedia information has relatively good flexibility and diversity, thereby improving interactivity during information sharing.

Optionally, based on the embodiment corresponding to the foregoing FIG. 12, in a first optional embodiment of the multimedia information sharing method provided in the embodiments of the present disclosure, after the presenting the VR target multimedia information, the method may further include:

receiving an interactive operation instruction;

performing an operation on the VR target multimedia information according to the interactive operation instruction, to generate interactive operation information, the operation comprising at least one of selection, move, zoom-in, zoom-out, and playback; and transmitting the interactive operation information to the server, to enable the server to transmit the interactive operation information to the second multimedia information sharing apparatus, the interactive operation information being used for instructing the second multimedia information sharing apparatus to perform the operation on the VR target multimedia information.

In this embodiment, after presenting the VR target multimedia information, the second multimedia information sharing apparatus may further receive an operation performed by the user (receiver) on the second multimedia information sharing apparatus. An interactive operation instruction triggered by the user is first received. For example, the interactive operation instruction is an action of moving a VR image. The second multimedia information sharing apparatus then performs a corresponding operation on a local VR display screen according to the action, that is, moving the VR image from top to bottom. Meanwhile, the second multimedia information sharing apparatus generates a piece of interactive operation information according to the interactive operation instruction, the interactive operation information carrying content of the operation of the user, for example, "moving a VR image from top to bottom". Therefore, the second multimedia information sharing apparatus transmits the interactive operation information to the server, to enable the server to transmit the interactive operation information to the first multimedia information sharing apparatus.

The first multimedia information sharing apparatus may perform an operation on the VR target multimedia information according to the interactive operation information, that is, moving the VR image from top to bottom on a VR display screen of the sharer, to synchronously present the VR target multimedia information.

Besides, in this embodiment of the present disclosure, the receiver may perform a corresponding operation on VR target multimedia information according to a requirement. By performing such an operation, interactive operation information is formed, and the sharer performs the same operation on the VR target multimedia information according to the interactive operation information, to improve flexibility and practicality of VR target multimedia information presentation, and strengthen interactivity between the user and the VR target multimedia information.

Figure 13:
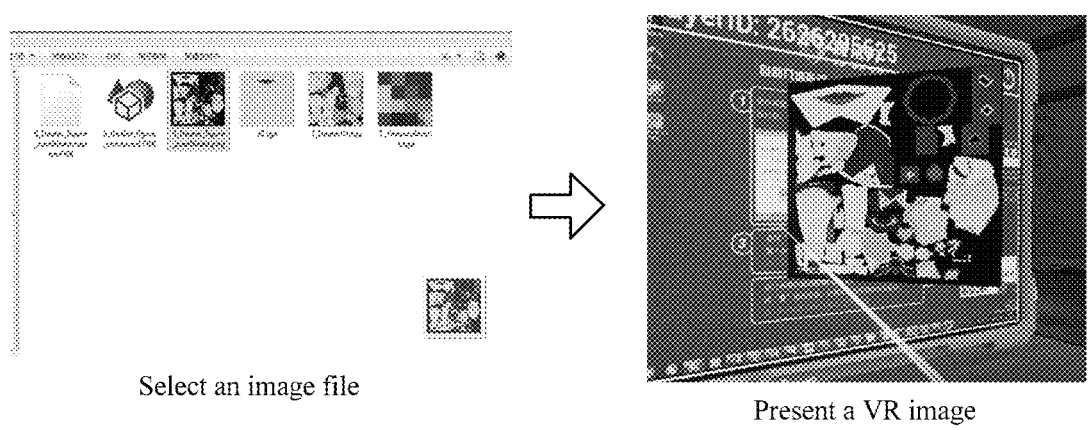
FIG. 13 is a schematic diagram of selecting an image file in an application scenario according to the present disclosure.

For ease of understanding, a process of generating the VR target multimedia information in the present disclosure is described below by using a specific application scenario. For example, a user A intends to share an image with a user B, so that the user A selects an image file on a VR display desktop on a PC end. FIG. 13 is a schematic diagram of selecting an image file in an application scenario according to the present disclosure. As shown in the figure, the user A may locally select an image, and then the PC converts the image into a VR image, and projects the VR image on a local VR display screen of the user A. Therefore, the user A may view the VR image by using the VR display screen and perform an interactive operation, such as grab, cast, or the like, on the VR image. Certainly, the image selected by the user A is also uploaded to a VR server. The VR server transmits the image selected by the user A to a PC end of the user B, and similarly, the VR image is also displayed on a local VR display screen of the user B. If the user A performs a zoom-in operation on the image, the user B may also see, on the VR display screen, that the VR image is zoomed in.

Figure 14:
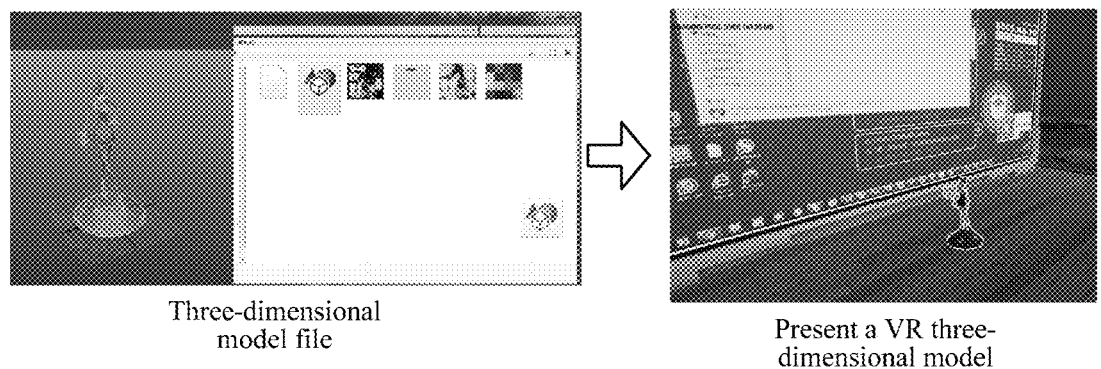
FIG. 14 is a schematic diagram of selecting 3D model file in an application scenario according to the present disclosure.

For example, a user A intends to share a 3D model with a user B, so that the user A selects a 3D model file on a VR display desktop on a PC end. FIG. 14 is a schematic diagram of selecting a 3D model file in an application scenario according to the present disclosure. As shown in the figure, the user A may locally select a 3D model file, and then the PC converts the 3D model file into a VR 3D model, and projects the VR 3D model on a local VR display screen of the user A. Therefore, the user A may view the VR 3D model by using the VR display screen and perform an interactive operation, such as grab, cast, or the like, on the VR 3D model. Certainly, the VR 3D model selected by the user A is also uploaded to a VR server. The VR server transmits the VR 3D model selected by the user A to a PC end of the user B, and similarly, the VR 3D model is also displayed on a local VR display screen of the user B. If the user A performs a cast operation on the VR 3D model, the user B may also see, on the VR display screen, that the VR 3D model is cast.

Figure 15:
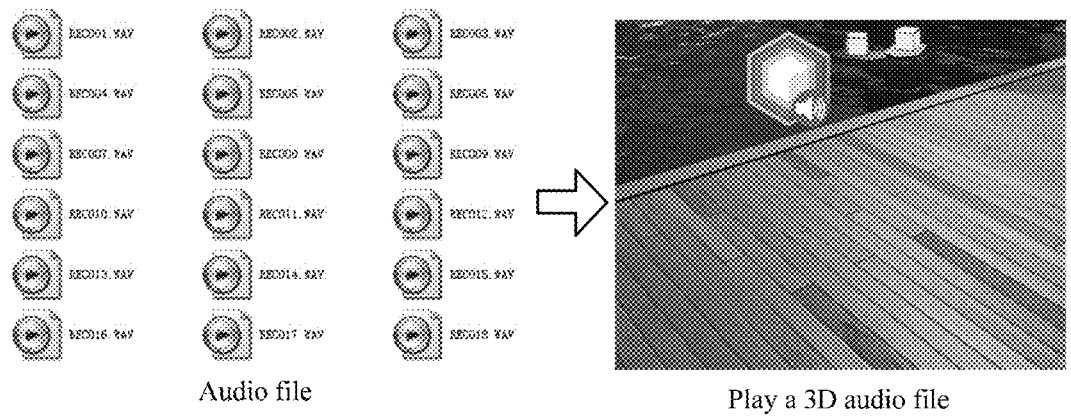
FIG. 15 is a schematic diagram of selecting an audio file in an application scenario according to the present disclosure.

For example, a user A intends to share a piece of music with a user B, so that the user A selects an audio file on a VR display desktop on a PC end. FIG. 15 is a schematic diagram of selecting an audio file in an application scenario according to the present disclosure. As shown in the figure, the user A may locally select an audio file, and then the PC converts the audio file into 3D audio, and plays the 3D audio by using a playback device. The user B may obtain the 3D audio from a VR server, and then play the 3D audio on a local playback device of the user B.

Figure 16:
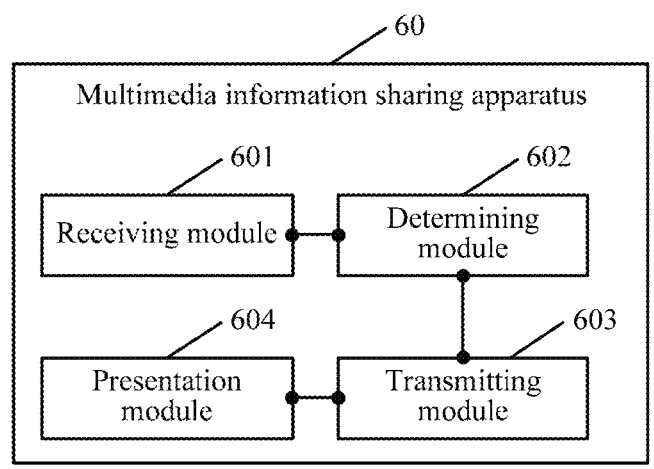
FIG. 16 is a schematic diagram of an embodiment of a multimedia information sharing apparatus according to an embodiment of the present disclosure.

The multimedia information sharing apparatus in the present disclosure is described below in detail. Referring to FIG. 16, the multimedia information sharing apparatus in the embodiments of the present disclosure is applied to a multimedia information sharing system, the multimedia information sharing system further including a VR server and a second multimedia information sharing apparatus. The multimedia information sharing apparatus 60 includes:

a receiving module 601, configured to receive a multimedia information sharing instruction by using a VR display desktop, the VR display desktop being configured to present a multimedia information icon, the multimedia information sharing instruction being used for selecting the multimedia information icon, and the multimedia information icon having a correspondence with multimedia information;

a determining module 602, configured to determine to-be-transmitted target multimedia information according to the multimedia information sharing instruction received by the receiving module 601;

a transmitting module 603, configured to transmit the target multimedia information determined by the determining module 602 to the VR server, to enable the VR server to transmit the target multimedia information to the second multimedia information sharing apparatus, the multimedia information being used by the second multimedia information sharing apparatus to generate VR target multimedia information corresponding to the target multimedia information and present the VR target multimedia information; and a presentation module 604, configured to generate the VR target multimedia information according to the target multimedia information determined by the determining module 602, and present the VR target multimedia information.

In this embodiment, the receiving module 601 receives the multimedia information sharing instruction by using the VR display desktop, the VR display desktop being configured to present a multimedia information icon, the multimedia information sharing instruction being used for selecting the multimedia information icon, and the multimedia information icon having a correspondence with multimedia information; the determining module 602 determines the to-be-transmitted target multimedia information according to the multimedia information sharing instruction received by the receiving module 601; the transmitting module 603 transmits the target multimedia information determined by the determining module 602 to the VR server, to enable the VR server to transmit the target multimedia information to the second multimedia information sharing apparatus, the multimedia information being used by the second multimedia information sharing apparatus to generate VR target multimedia information corresponding to the target multimedia information and present the VR target multimedia information; and the presentation module 604 generates the VR target multimedia information according to the target multimedia information determined by the determining module 602, and presents the VR target multimedia information.

In the technical solution provided in this embodiment of the present disclosure, a multimedia information sharing method is provided. Multimedia information is processed into VR target multimedia information, so that both an information receiving party and an information transmitting party can view the VR target multimedia information in a VR environment. The VR target multimedia information has relatively good flexibility and diversity, thereby improving interactivity during information sharing.

Optionally, based on the embodiment corresponding to the foregoing FIG. 16, in another embodiment of the multimedia information sharing apparatus 60 provided in the embodiments of the present disclosure, the multimedia information sharing apparatus 60 further includes:

the receiving module 601, specifically configured to obtain a screen ratio value and real-time operation information by using the VR display desktop, the screen ratio value being used for representing a ratio of a space coordinate value to a reference coordinate value, and the real-time operation information being used for representing an operation performed by a user on a controller; and generate the multimedia information sharing instruction according to the screen ratio value and the real-time operation information.

Besides, in this embodiment of the present disclosure, how to determine to-be-transmitted multimedia information according to a multimedia information sharing instruction triggered by a user is described. That is, a first multimedia information sharing apparatus obtains a space coordinate value between a ray of a controller and a VR display screen according to the multimedia information sharing instruction, then determines a screen ratio value according to the space coordinate value and a reference coordinate value of the VR display screen, and finally obtains a screen ratio value according to the screen ratio value, a width value of the VR display screen, and a height value of the VR display screen. In addition, real-time operation information is further obtained according to the multimedia information sharing instruction, and the to-be-transmitted multimedia information is determined with reference to the screen ratio value and the real-time operation information. In the foregoing manner, feasibility and operability of the solution in an actual application are improved.

Figure 17:
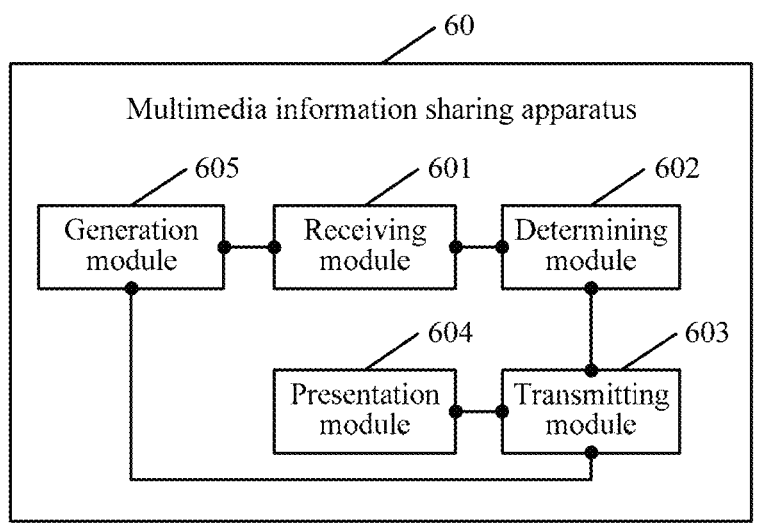
FIG. 17 is a schematic diagram of another embodiment of a multimedia information sharing apparatus according to an embodiment of the present disclosure.

Optionally, based on the embodiment corresponding to the foregoing FIG. 16, referring to FIG. 17, in another embodiment of the multimedia information sharing apparatus 60 provided in the embodiments of the present disclosure, the multimedia information sharing apparatus 60 further includes: a generation module 605.

The receiving module 601, further configured to be used by the presentation module 604 to generate the VR target multimedia information according to the multimedia information, and receive an interactive operation instruction after presenting the VR target multimedia information.

The generation module 605, configured to perform an operation on the VR target multimedia information according to the interactive operation instruction received by the receiving module 601, to generate interactive operation information, the operation including at least one of selection, move, zoom-in, zoom-out, and playback.

The transmitting module 603 is further configured to transmit the interactive operation information generated by the generation module 605 to the server, to enable the server to transmit the interactive operation information to the second multimedia information sharing apparatus, the interactive operation information being used for instructing the second multimedia information sharing apparatus to perform the operation on the VR target multimedia information.

Besides, in this embodiment of the present disclosure, after presenting the VR target multimedia information, the first multimedia information sharing apparatus may further receive an interactive operation instruction, then perform an operation on the VR target multimedia information according to the interactive operation instruction, to generate interactive operation information, and finally transmit the interactive operation information to the server. The server transmits the interactive operation information to the second multimedia information sharing apparatus. In the foregoing manner, a sharer may perform a corresponding operation on VR target multimedia information according to a requirement. By performing such an operation, interactive operation information is formed, and a receiver performs the same operation on the VR target multimedia information according to the interactive operation information, to improve flexibility and practicality of VR target multimedia information presentation, and strengthen interactivity between a user and the VR target multimedia information.

Optionally, based on the embodiment corresponding to the foregoing FIG. 16, in another embodiment of the multimedia information sharing apparatus 60 provided in the embodiments of the present disclosure, the multimedia information sharing apparatus 60 further includes:

the multimedia information being an image file;

the presentation module 604, specifically configured to create a corresponding first tile according to the image file, the first tile being used for binding image data in the image file;

map the first tile to a pre-configured rectangular mesh model, to obtain a VR image; and present the VR image by using a VR display screen.

Moreover, in this embodiment of the present disclosure, in a case in which the multimedia information is an image file, a corresponding first tile may be created according to the image file, then the first tile is mapped to the pre-configured rectangular mesh model, to obtain a VR image, and finally the VR image is presented by using a VR display screen. In the foregoing manner, a common image may be presented to a user in a form of a VR image for viewing and operating, to improve practicality and feasibility of the solution. Relatively strong multi-perception, sense of existence, and autonomy exist in the VR scenario.

Optionally, based on the embodiment corresponding to the foregoing FIG. 16, in another embodiment of the multimedia information sharing apparatus 60 provided in the embodiments of the present disclosure, the multimedia information sharing apparatus 60 further includes:

the multimedia information being a 3D model file;

the presentation module, specifically configured to create a corresponding second tile according to the 3D model file, the second tile being used for binding 3D model data in the 3D model file;

map the second tile to a pre-configured three-dimensional mesh model, to obtain a VR three-dimensional model; and present the VR three-dimensional model by using the VR display screen.

Moreover, in this embodiment of the present disclosure, in a case in which the multimedia information is a 3D model file, the first multimedia information sharing apparatus may create a corresponding second tile according to the 3D model file, then map the second tile to the pre-configured 3D mesh model, to obtain a VR 3D model, and finally present the VR 3D model by using a VR display screen. In the foregoing manner, a common 3D model file may be presented to a user in a form of a VR 3D model for viewing and operating, to improve practicality and feasibility of the solution. Relatively strong multi-perception, sense of existence, and autonomy exist in the VR scenario.

Optionally, based on the embodiment corresponding to the foregoing FIG. 16, in another embodiment of the multimedia information sharing apparatus 60 provided in the embodiments of the present disclosure, the multimedia information sharing apparatus 60 further includes:

the multimedia information being an audio file;

the presentation module, specifically configured to convert the audio file into a 3D audio file; and play the 3D audio file.

Moreover, in this embodiment of the present disclosure, when multimedia information selected by a transmitting party is an audio file, the first multimedia information sharing apparatus may first convert the audio file selected by the transmitting party into a 3D audio file, and then play the 3D audio file. In the foregoing manner, both the transmitting party and a receiving party can hear 3D audio having a better stereo effect, so that practicality of the solution is improved, and user experience is enhanced.

Figure 18:
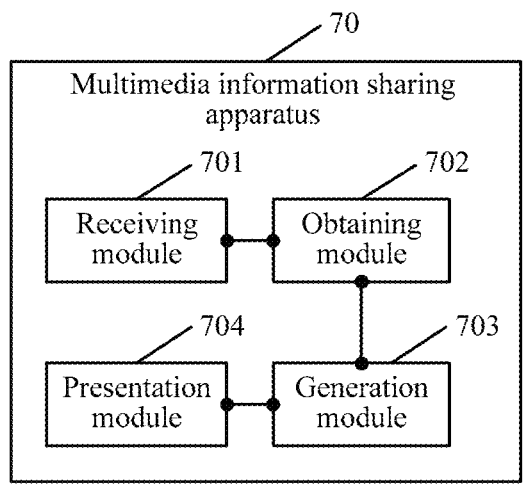
FIG. 18 is a schematic diagram of an embodiment of a multimedia information sharing apparatus according to an embodiment of the present disclosure.

The first multimedia information sharing apparatus in the present disclosure is described above. The second multimedia information sharing apparatus in the present disclosure is described below in detail. Referring to FIG. 18, the multimedia information sharing apparatus in the embodiments of the present disclosure is applied to a multimedia information sharing system, the multimedia information sharing system further including a first multimedia information sharing apparatus and a VR server. The multimedia information sharing apparatus 70 includes:

a receiving module 701, configured to receive a multimedia information playback instruction;

an obtaining module 702, configured to obtain target multimedia information from the VR server according to the multimedia information playback instruction received by the receiving module 701, the target multimedia information being transmitted to the VR server by the first multimedia information sharing apparatus, and being used by the first multimedia information sharing apparatus to generate VR target multimedia information and present the VR target multimedia information;

a generation module 703, configured to generate the VR target multimedia information according to the target multimedia information obtained by the obtaining module 702; and a presentation module 704, configured to present the VR target multimedia information generated by the generation module 703.

In this embodiment, the receiving module 701 receives a multimedia information playback instruction; the obtaining module 702 obtains target multimedia information from the VR server according to the multimedia information playback instruction received by the receiving module 701, the target multimedia information being transmitted to the VR server by the first multimedia information sharing apparatus, and being used by the first multimedia information sharing apparatus to generate VR target multimedia information and present the VR target multimedia information; the generation module 703 generates the VR target multimedia information according to the target multimedia information obtained by the obtaining module 702; and the presentation module 704 presents the VR target multimedia information generated by the generation module 703.

In this embodiment of the present disclosure, a multimedia information sharing method is provided. Multimedia information may be processed into VR target multimedia information, so that both an information receiving party and an information transmitting party can view the VR target multimedia information in a VR environment. The VR target multimedia information has relatively good flexibility and diversity, thereby improving interactivity during information sharing.

Figure 19:
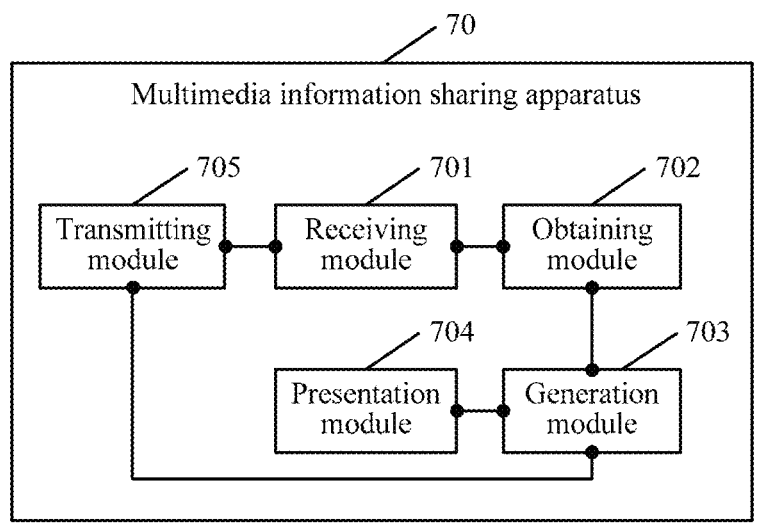
FIG. 19 is a schematic diagram of another embodiment of a multimedia information sharing apparatus according to an embodiment of the present disclosure.

Optionally, based on the embodiment corresponding to the foregoing FIG. 18, referring to FIG. 19, in another embodiment of the multimedia information sharing apparatus 70 provided in the embodiments of the present disclosure, the multimedia information sharing apparatus 70 further includes: a transmitting module 705.

The receiving module 701 is further configured to receive an interactive operation instruction.

The generation module 703 is further configured to perform an operation on the VR target multimedia information according to the interactive operation instruction received by the receiving module 701, to generate interactive operation information, the operation including at least one of selection, move, zoom-in, zoom-out, and playback.

The transmitting module 705 is configured to transmit the interactive operation information generated by the generation module 703 to the server, to enable the server to transmit the interactive operation information to the first multimedia information sharing apparatus, the interactive operation information being used for instructing the first multimedia information sharing apparatus to perform an operation on the VR target multimedia information.

Besides, in this embodiment of the present disclosure, the receiver may perform a corresponding operation on VR target multimedia information according to a requirement. By performing such an operation, interactive operation information is formed, and the sharer performs the same operation on the VR target multimedia information according to the interactive operation information, to improve flexibility and practicality of VR target multimedia information presentation, and strengthen interactivity between the user and the VR target multimedia information.

Figure 20:
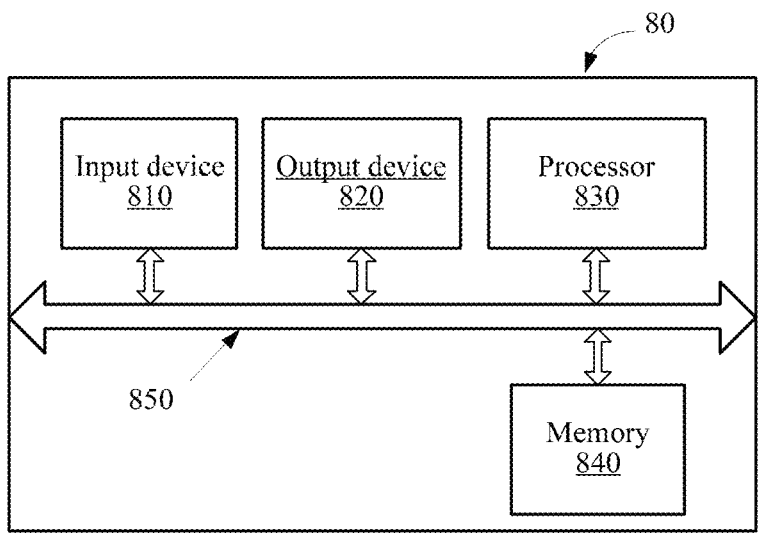
FIG. 20 is a schematic structural diagram of a multimedia information sharing apparatus according to an embodiment of the present disclosure.

FIG. 20 is a schematic structural diagram of a multimedia information sharing apparatus 80 according to an embodiment of the present disclosure. The multimedia information sharing apparatus 80 may include an input device 810, an output device 820, a processor 830, and a memory 840. The output device in this embodiment of the present disclosure may be a display device.

The memory 840 may include a read-only memory (ROM) and a random access memory (RAM), and provide an instruction and data to the processor 830. A part of the memory 840 may further include a non-volatile random access memory (NVRAM).

The memory 840 stores the following elements, executable modules or data structures, or a subset thereof, or an extended set thereof:

operation instructions: including various operation instructions, used for implementing various operations; and operating system: including various system programs, used for implementing various basic services and processing hardware-based tasks.

In this embodiment of the present disclosure, the processor 830 is configured to perform the following steps:

receiving a multimedia information sharing instruction by using a VR display desktop, the VR display desktop being configured to present a multimedia information icon, the multimedia information sharing instruction being used for selecting the multimedia information icon, and the multimedia information icon having a correspondence with multimedia information;

determining to-be-transmitted target multimedia information according to the multimedia information sharing instruction;

transmitting the target multimedia information to the VR server, to enable the VR server to transmit the target multimedia information to the second multimedia information sharing apparatus, the multimedia information being used by the second multimedia information sharing apparatus to generate VR target multimedia information corresponding to the target multimedia information and present the VR target multimedia information; and generating the VR target multimedia information according to the target multimedia information, and presenting the VR target multimedia information.

The processor 830 is specifically configured to perform the following steps:

obtaining a screen ratio value and real-time operation information by using the VR display desktop, the screen ratio value being used for representing a ratio of a space coordinate value to a reference coordinate value, and the real-time operation information being used for representing an operation performed by a user on a controller; and generating the multimedia information sharing instruction according to the screen ratio value and the real-time operation information.

The processor 830 is specifically further configured to perform the following steps:

receiving an interactive operation instruction;

performing an operation on the VR target multimedia information according to the interactive operation instruction, to generate interactive operation information, the operation comprising at least one of selection, move, zoom-in, zoom-out, and playback; and transmitting the interactive operation information to the server, to enable the server to transmit the interactive operation information to the second multimedia information sharing apparatus, the interactive operation information being used for instructing the second multimedia information sharing apparatus to perform the operation on the VR target multimedia information.

In this embodiment of the present disclosure, the processor 830 is configured to perform the following steps:

creating a corresponding first tile according to the image file, the first tile being used for binding image data in the image file;

mapping the first tile to a pre-configured rectangular mesh model, to obtain a VR image; and presenting the VR image by using a VR display screen.

In this embodiment of the present disclosure, the processor 830 is configured to perform the following steps:

creating a corresponding second tile according to the three-dimensional model file, the second tile being used for binding three-dimensional model data in the three-dimensional model file;

mapping the second tile to a pre-configured three-dimensional mesh model, to obtain a VR three-dimensional model; and presenting the VR three-dimensional model by using the VR display screen.

In this embodiment of the present disclosure, the processor 830 is configured to perform the following steps:

converting the audio file into a 3D audio file; and playing the 3D audio file.

The processor 830 controls an operation of the multimedia information sharing apparatus 80, and the processor 830 may also be referred to as a central processing unit (CPU). The memory 840 may include a read-only memory (ROM) and a random access memory (RAM), and provide an instruction and data to the processor 830. A part of the memory 840 may further include an NVRAM. In specific application, components of the multimedia information sharing apparatus 80 are coupled together by using a bus system 850. In addition to a data bus, the bus system 850 may further include a power bus, a control bus, a status signal bus, and the like. However, for clear description, various buses are all labeled as the bus system 850 in the figure.

The method disclosed in the foregoing embodiments of the present disclosure may be applied to the processor 830, or may be implemented by the processor 830. The processor 830 may be an integrated circuit chip having a signal processing capability. In an implementation process, the steps in the foregoing method may be completed by using an integrated logic circuit of hardware in the processor 830 or an instruction in a form of software. The foregoing processor 830 may be a general purpose processor, a digital signal processor (DSP), an application-specific integrated circuit (ASIC), a field-programmable gate array (FPGA) or another programmable logic device, a discrete gate or a transistor logic device, or a discrete hardware component. Disclosed methods, steps, and logic block diagrams in the embodiments of the present disclosure may be implemented or executed. The general purpose processor may be a microprocessor or the processor may be any conventional processor or the like. The steps in the methods disclosed with reference to the embodiments of the present disclosure may be directly embodied as to be executed and completed by a hardware decoding processor or to be executed and completed by a combination of hardware and software modules in the decoding processor. The software module may be located in a mature storage medium in the art, such as a RAM, a flash memory, a ROM, a programmable ROM, an electrically-erasable programmable memory, a register, or the like. The storage medium is located in the memory 840, and the processor 830 reads information in the memory 840, and completes the steps in the foregoing methods in combination with hardware thereof.

For understanding of related descriptions of FIG. 20, refer to the related descriptions and effects of the method in FIG. 3. Details are not further described herein.

Figure 21:
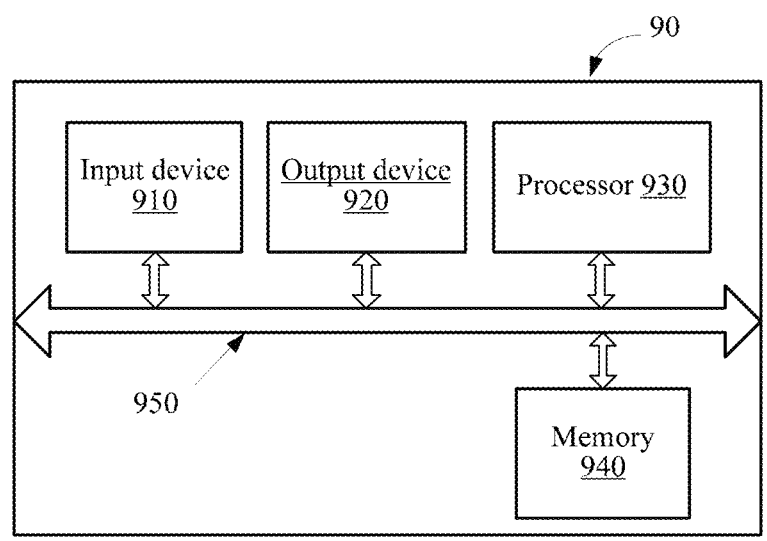
FIG. 21 is a schematic structural diagram of a multimedia information sharing apparatus according to an embodiment of the present disclosure.

FIG. 21 is a schematic structural diagram of a multimedia information sharing apparatus 90 according to an embodiment of the present disclosure. The multimedia information sharing apparatus 90 may include an input device 910, an output device 920, a processor 930, and a memory 940. The output device in this embodiment of the present disclosure may be a display device.

The memory 940 may include a read-only memory (ROM) and a random access memory (RAM), and provide an instruction and data to the processor 930. A part of the memory 940 may further include an NVRAM.

The memory 940 stores the following elements, executable modules or data structures, or a subset thereof, or an extended set thereof:

operation instructions: including various operation instructions, used for implementing various operations; and operating system: including various system programs, used for implementing various basic services and processing hardware-based tasks.

In this embodiment of the present disclosure, the processor 930 is configured to perform the following steps:

receiving a multimedia information playback instruction;

obtaining target multimedia information from the VR server according to the multimedia information playback instruction, the target multimedia information being transmitted to the VR server by the first multimedia information sharing apparatus, and being used by the first multimedia information sharing apparatus to generate VR target multimedia information and present the VR target multimedia information;

generating the VR target multimedia information according to the target multimedia information; and presenting the VR target multimedia information.

In this embodiment of the present disclosure, the processor 930 is configured to perform the following steps:

receiving an interactive operation instruction;

performing an operation on the VR target multimedia information according to the interactive operation instruction, to generate interactive operation information, the operation comprising at least one of selection, move, zoom-in, zoom-out, and playback; and transmitting the interactive operation information to the server, to enable the server to transmit the interactive operation information to the first multimedia information sharing apparatus, the interactive operation information being used for instructing the first multimedia information sharing apparatus to perform an operation on the VR target multimedia information.

The processor 930 controls an operation of the multimedia information sharing apparatus 90, and the processor 930 may also be referred to as a central processing unit (CPU). The memory 940 may include a read-only memory (ROM) and a random access memory (RAM), and provide an instruction and data to the processor 930. A part of the memory 940 may further include an NVRAM. In specific application, components of the multimedia information sharing apparatus 90 are coupled together by using a bus system 950. In addition to a data bus, the bus system 950 may further include a power bus, a control bus, a status signal bus, and the like. However, for clear description, various buses are all labeled as the bus system 950 in the figure.

The method disclosed in the foregoing embodiments of the present disclosure may be applied to the processor 930, or may be implemented by the processor 930. The processor 930 may be an integrated circuit chip having a signal processing capability. In an implementation process, the steps in the foregoing method may be completed by using an integrated logic circuit of hardware in the processor 930 or an instruction in a form of software. The foregoing processor 930 may be a general purpose processor, a DSP, an ASIC, an FPGA or another programmable logic device, a discrete gate or a transistor logic device, or a discrete hardware component. Disclosed methods, steps, and logic block diagrams in the embodiments of the present disclosure may be implemented or executed. The general purpose processor may be a microprocessor or the processor may be any conventional processor or the like. The steps in the methods disclosed with reference to the embodiments of the present disclosure may be directly embodied as to be executed and completed by a hardware decoding processor or to be executed and completed by a combination of hardware and software modules in the decoding processor. The software module may be located in a mature storage medium in the art, such as a RAM, a flash memory, a ROM, a programmable ROM, an electrically-erasable programmable memory, a register, or the like. The storage medium is located in the memory 940, and the processor 930 reads information in the memory 940, and completes the steps in the foregoing methods in combination with hardware thereof.

For understanding of related descriptions of FIG. 21, refer to the related descriptions and effects of the method in FIG. 12. Details are not further described herein.

Figure 22:
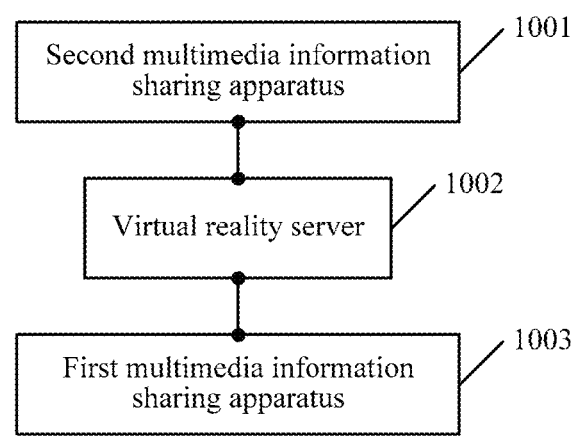
FIG. 22 is a schematic diagram of an embodiment of a multimedia information sharing system according to an embodiment of the present disclosure.

FIG. 22 is a schematic diagram of an embodiment of a multimedia information sharing system according to an embodiment of the present disclosure. The multimedia information sharing system includes a first multimedia information sharing apparatus 1003, a VR server 1002, and a second multimedia information sharing apparatus 1001. The multimedia information sharing system includes:

receiving, by the first multimedia information sharing apparatus 1003, a multimedia information sharing instruction by using a VR display desktop, the VR display desktop being used for presenting a multimedia information icon, the multimedia information sharing instruction being used for selecting the multimedia information icon, and the multimedia information icon having a correspondence with multimedia information;

determining, by the first multimedia information sharing apparatus 1003, to-be-transmitted target multimedia information according to the multimedia information sharing instruction, and transmitting the target multimedia information to the VR server 1002, to enable the VR server 1002 to transmit the target multimedia information to the second multimedia information sharing apparatus 1001, the multimedia information being used by the second multimedia information sharing apparatus 1001 to generate VR target multimedia information corresponding to the target multimedia information and present the VR target multimedia information; and generating, by the first multimedia information sharing apparatus 1003, the VR target multimedia information according to the target multimedia information, and presenting the VR target multimedia information.

In the technical solution provided in this embodiment of the present disclosure, a multimedia information sharing system is provided. By using the system, multimedia information may be processed into VR target multimedia information, so that both an information receiving party and an information transmitting party can view the VR target multimedia information in a VR environment. The VR target multimedia information has relatively good flexibility and diversity, thereby improving interactivity during information sharing.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the several embodiments provided in the present disclosure, it is to be understood that the disclosed system, apparatus, and method may be implemented in other manners. For example, the described apparatus embodiment is merely exemplary. For example, the unit division is merely logical function division and there may be another division manner during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in the form of a software product. The software product is stored in a storage medium and includes several instructions for enabling a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, a compact disc, or the like.

The foregoing embodiments are merely intended for describing the technical solutions of the present disclosure, but not for limiting the present disclosure. Although the present disclosure is described in detail with reference to the foregoing embodiments, a person of ordinary skill in the art needs to understand that modifications may still be made to the technical solutions described in the foregoing embodiments or make equivalent replacements to some technical features thereof, without departing from the spirit and scope of the technical solutions of the embodiments of the present disclosure.

What is claimed is:

1. A multimedia information sharing method, applied to a multimedia information sharing system, the multimedia information sharing system comprising a first multimedia information sharing apparatus, a virtual reality (VR) server, and a second multimedia information sharing apparatus, and the method comprising:

receiving, via a VR display desktop at the first multimedia information sharing apparatus, a multimedia information sharing instruction, the VR display desktop being configured to present a multimedia information icon, the multimedia information sharing instruction being used for selecting the multimedia information icon and dragging the multimedia information icon from the VR display desktop to a first VR display screen corresponding to the first multimedia information sharing apparatus in a VR scene associated with the VR server, and the multimedia information icon having a correspondence with multimedia information;

determining, at the first multimedia information sharing apparatus, to-be-transmitted target multimedia information according to the multimedia information sharing instruction;

transmitting the target multimedia information from the first multimedia information sharing apparatus to the VR server, wherein the VR server transmits the target multimedia information from the first VR display screen to a second VR display screen corresponding to the second multimedia information sharing apparatus in the VR scene, the multimedia information being used by the second multimedia information sharing apparatus to generate VR target multimedia information corresponding to the target multimedia information and present the VR target multimedia information; and generating, at the second multimedia information sharing apparatus, the VR target multimedia information according to the target multimedia information, and presenting the VR target multimedia information.

2. The method according to claim 1, wherein the receiving, via a VR display desktop at the first multimedia information sharing apparatus, a multimedia information sharing instruction comprises:

obtaining, via the VR display desktop, a screen ratio value and real-time operation information, the screen ratio value being used for representing a ratio of a space coordinate value to a reference coordinate value, and the real-time operation information being used for representing an operation performed by a user on a controller coupled to the first multimedia information sharing apparatus; and generating the multimedia information sharing instruction according to the screen ratio value and the real-time operation information.

3. The method according to claim 1, the method further comprising:

after generating, at the second multimedia information sharing apparatus, the VR target multimedia information according to the target multimedia information, and presenting the VR target multimedia information:

receiving an interactive operation instruction from a user on a controller coupled to the first multimedia information sharing apparatus;

performing an operation on the VR target multimedia information according to the interactive operation instruction, to generate interactive operation information, the operation comprising at least one of selection, move, zoom-in, zoom-out, and playback; and transmitting the interactive operation information from the first multimedia information sharing apparatus to the server, wherein the server transmits the interactive operation information to the second multimedia information sharing apparatus, the interactive operation information being used for instructing the second multimedia information sharing apparatus to perform the operation on the VR target multimedia information.

4. The method according to claim 1, wherein the multimedia information is an image file; and the generating, at the second multimedia information sharing apparatus, the VR target multimedia information according to the target multimedia information, and presenting the VR target multimedia information comprises:

creating a first tile corresponding to the image file, the first tile being used for binding image data in the image file;

mapping the first tile to a pre-configured rectangular mesh model, to obtain a VR image; and presenting the VR image by using the VR display screen at the second multimedia information sharing apparatus.

5. The method according to claim 1, wherein the multimedia information is a three-dimensional model file; and the generating, at the second multimedia information sharing apparatus, the VR target multimedia information according to the target multimedia information, and presenting the VR target multimedia information comprises:

creating a second tile corresponding to the three-dimensional model file, the second tile being used for binding three-dimensional model data in the three-dimensional model file;

mapping the second tile to a pre-configured three-dimensional mesh model, to obtain a VR three-dimensional model; and presenting the VR three-dimensional model by using a VR display screen at the second multimedia information sharing apparatus.

6. The method according to claim 1, wherein the multimedia information is an audio file; and the generating, at the second multimedia information sharing apparatus, the VR target multimedia information according to the target multimedia information, and presenting the VR target multimedia information comprises:

converting the audio file into a 3D audio file; and playing the 3D audio file at the second multimedia information sharing apparatus.

7. A multimedia information sharing system comprising a virtual reality (VR) server, a first multimedia information sharing apparatus, and a second multimedia information sharing apparatus, each having memory, a processor, and a bus system, the memory being configured to store a plurality of programs;

the processor being configured to execute the plurality of programs in the memory to perform a plurality of operations including:

receiving, via a VR display desktop at the first multimedia information sharing apparatus, a multimedia information sharing instruction, the VR display desktop being configured to present a multimedia information icon, the multimedia information sharing instruction being used for selecting the multimedia information icon and dragging the multimedia information icon from the VR display desktop to a first VR display screen corresponding to the first multimedia information sharing apparatus in a VR scene associated with the VR server, and the multimedia information icon having a correspondence with multimedia information;

determining, at the first multimedia information sharing apparatus, to-be-transmitted target multimedia information according to the multimedia information sharing instruction;

transmitting the target multimedia information from the first multimedia information sharing apparatus to the VR server, wherein the VR server transmits the target multimedia information from the first VR display screen to a second VR display screen corresponding to the second multimedia information sharing apparatus in the VR scene, the multimedia information being used by the second multimedia information sharing apparatus to generate VR target multimedia information corresponding to the target multimedia information and present the VR target multimedia information; and generating, at the second multimedia information sharing apparatus, the VR target multimedia information according to the target multimedia information, and presenting the VR target multimedia information; and the bus system being configured to connect the memory to the processor, to enable the memory to communicate with the processor.

8. The multimedia information sharing system according to claim 7, wherein the plurality of operations include:

obtaining, via the VR display desktop, a screen ratio value and real-time operation information, the screen ratio value being used for representing a ratio of a space coordinate value to a reference coordinate value, and the real-time operation information being used for representing an operation performed by a user on a controller coupled to the first multimedia information sharing apparatus; and generating the multimedia information sharing instruction according to the screen ratio value and the real-time operation information.

9. The multimedia information sharing system according to claim 7, wherein the plurality of operations include:

after generating, at the second multimedia information sharing apparatus, the VR target multimedia information according to the target multimedia information, and presenting the VR target multimedia information:

receiving an interactive operation instruction from a user on a controller coupled to the first multimedia information sharing apparatus;

performing an operation on the VR target multimedia information according to the interactive operation instruction, to generate interactive operation information, the operation comprising at least one of selection, move, zoom-in, zoom-out, and playback; and transmitting the interactive operation information from the first multimedia information sharing apparatus to the server, wherein the server transmits the interactive operation information to the second multimedia information sharing apparatus, the interactive operation information being used for instructing the second multimedia information sharing apparatus to perform the operation on the VR target multimedia information.

10. The multimedia information sharing system according to claim 7, wherein the multimedia information is an image file; and the generating, at the second multimedia information sharing apparatus, the VR target multimedia information according to the target multimedia information, and presenting the VR target multimedia information comprises:

creating a first tile corresponding to the image file, the first tile being used for binding image data in the image file;

mapping the first tile to a pre-configured rectangular mesh model, to obtain a VR image; and presenting the VR image by using the VR display screen at the second multimedia information sharing apparatus.

11. The multimedia information sharing system according to claim 7, wherein the multimedia information is a three-dimensional model file; and the generating, at the second multimedia information sharing apparatus, the VR target multimedia information according to the target multimedia information, and presenting the VR target multimedia information comprises:

creating a second tile corresponding to the three-dimensional model file, the second tile being used for binding three-dimensional model data in the three-dimensional model file;

mapping the second tile to a pre-configured three-dimensional mesh model, to obtain a VR three-dimensional model; and presenting the VR three-dimensional model by using a VR display screen at the second multimedia information sharing apparatus.

12. The multimedia information sharing system according to claim 7, wherein the multimedia information is an audio file; and the generating, at the second multimedia information sharing apparatus, the VR target multimedia information according to the target multimedia information, and presenting the VR target multimedia information comprises:

converting the audio file into a 3D audio file; and playing the 3D audio file at the second multimedia information sharing apparatus.

13. A non-transitory computer-readable storage medium comprising a plurality of program instructions, the program instructions, when executed by a multimedia information sharing system comprising a virtual reality (VR) server, a first multimedia information sharing apparatus, and a second multimedia information sharing apparatus, cause the multimedia information sharing system to perform a plurality of operations including:

receiving, via a VR display desktop at the first multimedia information sharing apparatus, a multimedia information sharing instruction, the VR display desktop being configured to present a multimedia information icon, the multimedia information sharing instruction being used for selecting the multimedia information icon and dragging the multimedia information icon from the VR display desktop to a first VR display screen corresponding to the first multimedia information sharing apparatus in a VR scene associated with the VR server, and the multimedia information icon having a correspondence with multimedia information;

determining, at the first multimedia information sharing apparatus, to-be-transmitted target multimedia information according to the multimedia information sharing instruction;

transmitting the target multimedia information from the first multimedia information sharing apparatus to the VR server, wherein the VR server transmits the target multimedia information from the first VR display screen to a second VR display screen corresponding to the second multimedia information sharing apparatus in the VR scene, the multimedia information being used by the second multimedia information sharing apparatus to generate VR target multimedia information corresponding to the target multimedia information and present the VR target multimedia information; and generating, at the second multimedia information sharing apparatus, the VR target multimedia information according to the target multimedia information, and presenting the VR target multimedia information.

14. The non-transitory computer-readable storage medium according to claim 13, wherein the plurality of operations include:

obtaining, via the VR display desktop, a screen ratio value and real-time operation information, the screen ratio value being used for representing a ratio of a space coordinate value to a reference coordinate value, and the real-time operation information being used for representing an operation performed by a user on a controller coupled to the first multimedia information sharing apparatus; and generating the multimedia information sharing instruction according to the screen ratio value and the real-time operation information.

15. The non-transitory computer-readable storage medium according to claim 13, wherein the plurality of operations include:

after generating, at the second multimedia information sharing apparatus, the VR target multimedia information according to the target multimedia information, and presenting the VR target multimedia information:

receiving an interactive operation instruction from a user on a controller coupled to the first multimedia information sharing apparatus;

performing an operation on the VR target multimedia information according to the interactive operation instruction, to generate interactive operation information, the operation comprising at least one of selection, move, zoom-in, zoom-out, and playback; and transmitting the interactive operation information from the first multimedia information sharing apparatus to the server, wherein the server transmits the interactive operation information to the second multimedia information sharing apparatus, the interactive operation information being used for instructing the second multimedia information sharing apparatus to perform the operation on the VR target multimedia information.

16. The non-transitory computer-readable storage medium according to claim 13, wherein the multimedia information is an image file; and the generating, at the second multimedia information sharing apparatus, the VR target multimedia information according to the target multimedia information, and presenting the VR target multimedia information comprises:

creating a first tile corresponding to the image file, the first tile being used for binding image data in the image file;

mapping the first tile to a pre-configured rectangular mesh model, to obtain a VR image; and presenting the VR image by using the VR display screen at the second multimedia information sharing apparatus.

17. The non-transitory computer-readable storage medium according to claim 13, wherein the multimedia information is a three-dimensional model file; and the generating, at the second multimedia information sharing apparatus, the VR target multimedia information according to the target multimedia information, and presenting the VR target multimedia information comprises:

creating a second tile corresponding to the three-dimensional model file, the second tile being used for binding three-dimensional model data in the three-dimensional model file;

mapping the second tile to a pre-configured three-dimensional mesh model, to obtain a VR three-dimensional model; and presenting the VR three-dimensional model by using a VR display screen at the second multimedia information sharing apparatus.

18. The non-transitory computer-readable storage medium according to claim 13, wherein the multimedia information is an audio file; and the generating, at the second multimedia information sharing apparatus, the VR target multimedia information according to the target multimedia information, and presenting the VR target multimedia information comprises:

converting the audio file into a 3D audio file; and playing the 3D audio file at the second multimedia information sharing apparatus.

* * * * *